(12) United States Patent
Beall

(10) Patent No.: US 11,293,410 B1
(45) Date of Patent: Apr. 5, 2022

(54) DIRECT DRIVE WIND TURBINE

(71) Applicant: H. Prince Beall, Estes Park, CO (US)

(72) Inventor: H. Prince Beall, Estes Park, CO (US)

(73) Assignee: Breezy Wind Turbines LLC, Estes Park, CO (US)

( * ) Notice: Subject to any disclaimer, the term of this patent is extended or adjusted under 35 U.S.C. 154(b) by 0 days.

(21) Appl. No.: 17/386,934

(22) Filed: Jul. 28, 2021

(51) Int. Cl.
*F03D 15/20* (2016.01)
*F03D 80/60* (2016.01)
*F03D 13/20* (2016.01)
*F03D 1/04* (2006.01)

(52) U.S. Cl.
CPC ............... *F03D 15/20* (2016.05); *F03D 1/04* (2013.01); *F03D 13/20* (2016.05); *F03D 80/60* (2016.05); *F05B 2240/12* (2013.01); *F05B 2240/211* (2013.01); *F05B 2240/912* (2013.01); *F05B 2260/40* (2013.01)

(58) Field of Classification Search
CPC . F03D 15/20; F03D 1/04; F03D 13/20; F03D 80/60; F05B 2240/12; F05B 2240/211; F05B 2240/912; F05B 2260/40
USPC ...................................... 290/44, 55
See application file for complete search history.

(56) References Cited

U.S. PATENT DOCUMENTS

| | | | |
|---|---|---|---|
| 4,720,640 A | 1/1988 | Anderson | |
| 6,492,743 B1 * | 12/2002 | Appa | ........................ F01D 1/32 |
| | | | 290/55 |
| 7,633,176 B1 | 12/2009 | Blittersdorf | |
| 7,944,074 B2 | 5/2011 | Longtin | |
| 8,040,011 B2 | 10/2011 | Mueller | |
| 8,222,762 B2 | 7/2012 | Borgen | |
| 8,545,187 B2 | 10/2013 | Presz, Jr. | |
| 8,742,612 B1 * | 6/2014 | Robbins | .................. F03D 13/10 |
| | | | 290/55 |
| 8,772,958 B2 * | 7/2014 | Kang | ..................... F03D 15/10 |
| | | | 290/55 |
| 9,347,433 B2 * | 5/2016 | Schellstede | ............... F03D 9/25 |
| 9,926,906 B2 | 3/2018 | Mansberger | |
| 10,280,895 B1 | 5/2019 | Keeley | |
| 2006/0163963 A1 | 7/2006 | Flores | |
| 2011/0001320 A1 | 1/2011 | Lagerweij | |
| 2015/0017016 A1 | 1/2015 | Beall | |
| 2017/0292497 A1 * | 10/2017 | Asfar | ..................... F03D 15/00 |
| 2020/0362825 A1 | 11/2020 | Barber | |

FOREIGN PATENT DOCUMENTS

EP          3396153          10/2018

* cited by examiner

Primary Examiner — Charles Reid, Jr.
(74) Attorney, Agent, or Firm — Critical Path IP Law, LLC

(57) ABSTRACT

Systems and methods to generate electrical power through a direct drive wind turbine. In one aspect, the system uses a diffuser cuff surrounding a counter rotating turbine operating inside a streamlined center body, the counter rotating turbine using a generator with an iron sandwich core. The main wind turbine blades are attached to a barrel stave that increases generator efficiency and distributes loading through the tower support structure.

20 Claims, 26 Drawing Sheets

DIRECT DRIVE WIND TURBINE

FIELD

The disclosure relates generally to systems and methods to generate electrical power through a wind turbine, and specifically to a direct drive wind turbine system and method of use.

BACKGROUND

Electrical power generation through wind energy has been pursued for centuries with varied success. The challenges associated with efficiently and effectively converting wind energy to useful power are numerous and, in some cases, unique. The challenges include wind variability, wind turbine durability, wind turbulence, high cut-in speeds, low RPMs, lack of storage capacity, and large losses from the cylindrical shaped blade root sections, nacelle and tower.

Wind varies continuously in direction and speed if there is any velocity at all. Power generation from wind is a function of wind speed cubed. Therefore, small changes in wind speed greatly increase the effects on the power output while utilities demand constant voltage.

Wind turbines need to be extremely robust or durable in order to tolerate sudden gusts near hurricane speeds. These unexpected gusts may require immediate shutdown, before the blade tip completes a full rotation, to avoid disintegration of the turbine blades after a tower strike. Winds not only fluctuate in speeds but from many directions. Disturbances can create large vortices. These turbulent eddies, from all directions, create high stresses in the blade tips and then throughout the rotating assembly, especially in the transmission gears.

Most conventional generators have iron cores, inside the windings, made of special laminated steel to greatly enhance the magnetic flux through the coils for greater output voltage. However, the magnets seek to align with the iron cores inside the coils. This causes uneven torque, known as 'cogging', and makes it hard even to start moving. Most of the present wind turbines have gears to speed up the rpms for a better match with the generator. Besides cogging problems, wind speeds need to be high enough to overcome gear resistance and inertia of the rotating assembly.

Rotation of the turbine blades is typically in the 10 to 60 rpm range; the largest wind turbines are the most efficient but turn the slowest. These high torque machines need to greatly step up the speeds to match efficient operating speeds of the generator.

Wind power must be used as produced instantaneously. Electricity provided by wind power cannot be released over time to meet peak demand periods, unlike water released through dams or power plants with coal, natural gas or nuclear power.

The nacelle, comprising the rotor shaft, bearings, transmission gearing, brakes and generator, accounts for only 1% of the rotor disc area but creates about 11% of the total disc losses. The turbulent wake behind the nacelle and tower causes the largest speed depression area aft of the rotor disc. The thick blade root sections, in close proximity with each other, blocks a lot of the incoming wind (high solidity) while the blades are moving.

A diffuser augmented wind turbine continues to be promoted to vastly increase power generated. However, they always place this shroud around the blade tips since the greatest torque comes from the outer quarter of the blade's span. The larger exit area does significantly reduce the static pressure at the diffuser exit to draw more air inside. Promoters of the Tip Diffusers mistakenly base the diffuser's power coefficient on the blade tips area instead of on the much larger diffuser exit's area. The theory usually omits what happens around any kind of nacelle center body. The turbine blade starts to stall out approaching 10 meters/sec. Wind careens off the spinner into the nacelle corners and out around the large round blade root. The suction side draws the central flows outboard of those cylindrical root sections and towards the blade tips as the flow separates off that other side. Large powerful root trailing vortices spin off the inner suction sides in the opposite direction from blade rotation. A huge separation bubble occurs, with a tip diffuser, downstream of the blade's root since most of the flow is drawn outboard along towards the diffuser exit. Wake vortices also disrupt central flows directly behind a bluff nacelle body. Root trailing vortices along with wake vortices meet up with the large diffuser separation bubble to create a central roadblock and seriously impact streamflow through the main turbine blades. Placing a monster diffuser wrapped around the blade tips also requires an enormous structure with unreasonable weights and costs.

The disclosure addresses if not solves the challenges or shortcomings of conventional wind turbine systems. A direct drive wind turbine system that uses a diffuser cuff surrounding a counter rotating turbine operating inside a streamlined center body provides a more efficient and effective wind turbine system. More specifically, a diffuser augmenter is positioned near a streamlined center body to form a high-speed channel which powers a counter rotating turbine. The counter rotating turbine has a stator section out front to set up two rotors moving in opposite directions. The first rotor assists the wind turbine blades in one direction and the following rotor moves in the opposite direction. Since the two rotors are rotating in opposing directions, the relative speed between the two has nearly doubled. A radial flux generator is positioned inside the chord of the diffuser ring or cuff. The inner and outer magnets are attached to corresponding "barrel staves" on the Rotor A assembly section, with the main turbine blades, while the armature coils are on Rotor B's assembly. Air flow from the nose inlet is compressed from Rotor B's impeller to force cooling air around the generator.

SUMMARY

A direct drive wind turbine system is disclosed that uses a diffuser cuff surrounding a counter rotating turbine operating inside a streamlined center body to provide a more efficient and effective wind turbine system.

In one embodiment, a method of generating electrical power from a direct drive wind turbine is disclosed, the method comprising: providing a direct drive wind turbine, the direct drive wind turbine comprising: a wind turbine body comprising: a center body; a nose inlet; a wind turbine shaft defining a longitudinal axis of the wind turbine body; a stator assembly comprising a set of stator blades; a diffuser augmenter cuff assembly comprising: a first rotor blade assembly rotating about the longitudinal axis in a first axial direction and comprising an outer barrel stave coupled to a set of outer magnets, an inner barrel stave coupled to a set of inner magnets, and a set of first rotor blades; a second rotor blade assembly rotating about the longitudinal axis in a second axial direction opposite the first axial direction and comprising armature coils positioned between the set of outer magnets and the set of inner magnets, and a set of second rotor blades; a set of short turbine blades; a set of main turbine blades connected to the first rotor blade assembly; and a support tower affixed to the Earth and attached to the wind turbine body; receiving airflows comprising: a first airflow into the nose inlet; a second airflow into the diffuser augmenter cuff assembly; a third airflow; and a fourth airflow: i) operating on the set of short turbine blades to create a short turbine blade torque about the wind turbine shaft and to rotate the first rotor blade assembly about the longitudinal axis, and ii) operating on the set of main turbine blades to create a main turbine blade torque about the wind turbine shaft and to rotate the first rotor blade assembly about the longitudinal axis; routing the second airflow within the diffuser augmented cuff assembly to form a channeled second airflow; and routing the channeled second airflow to the first rotor blade assembly to urge rotation of the first rotor blade assembly in the first axial direction and to urge rotation of the second rotor blade assembly about the second axial direction; wherein: the rotation of the set of outer magnets and the set of inner magnets opposite to the rotation of the armature coils generates electricity.

In one aspect, the wind turbine body further comprises an impeller assembly providing cooling to the set of outer magnets, the set of inner magnets, and the armature coils. In another aspect, the method further comprises the step of routing at least some of the first airflow into the impeller assembly. In another aspect, at least some of first airflow flows through a channel within the set of second rotor blades. In another aspect, a majority of structural loads from the main turbine blades are transferred to the support tower. In another aspect, the set of outer magnets, the set of inner magnets, and the armature coils form a radial flux generator. In another aspect, the third airflow is received by the set of outer magnets, the set of inner magnets, and the armature coils. In another aspect, the diffuser augmented cuff assembly attaches to the set of main turbine blades at a distance between 20%-30% of the length of a particular main turbine blade operating radius. In another aspect, each short turbine blade is connected to a respective main turbine blade by way of a Y winglet. In another aspect, each Y winglet is connected to a circular fence.

In another embodiment, a direct drive wind turbine system is disclosed, the system comprising: a wind turbine body comprising: a center body; a nose inlet; a wind turbine shaft defining a longitudinal axis of the wind turbine body; a stator assembly comprising a set of stator blades; a diffuser augmenter cuff assembly comprising: a first rotor blade assembly configured to rotate about the longitudinal axis in a first axial direction and comprising an outer barrel stave coupled to a set of outer magnets, an inner barrel stave coupled to a set of inner magnets, and a set of first rotor blades; a second rotor blade assembly configured to rotate about the longitudinal axis in a second axial direction opposite the first axial direction and comprising armature coils positioned between the set of outer magnets and the set of inner magnets, and a set of second rotor blades; a set of short turbine blades; a set of main turbine blades attached to the first rotor blade assembly; and a support tower affixed to the Earth and attached to the wind turbine body; wherein: a first airflow is received by the nose inlet, at least some of the first airflow routed into the impeller assembly; a second airflow is received by the diffuser augmenter cuff assembly and channeled to form a channeled second airflow, the channeled second airflow routed to engage the first rotor blade assembly, to urge rotation of the first rotor blade assembly in the first axial direction, and to urge rotation of the second rotor blade assembly about the second axial direction; a third airflow is received by the set of outer magnets, the set of inner magnets, and the armature coils; a fourth airflow is received by: i) the set of short turbine blades to create a short turbine blade torque about the wind turbine shaft and to rotate the first blade assembly about the longitudinal axis, and ii) the set of main turbine blades to create a main turbine blade torque about the wind turbine shaft and to rotate the first blade assembly about the longitudinal axis; and rotation of the set of outer magnets and the set of inner magnets opposite to the rotation of the armature coils generates electricity.

In one aspect, the wind turbine body further comprises an impeller assembly receiving at least some of the first airflow to provide cooling to at least one of the set of outer magnets, the set of inner magnets, and the armature coils. In another aspect, the impeller assembly outputs a received airflow in a radially outward direction. In another aspect, the support tower is attached to the stator assembly and to the second rotor assembly. In another aspect, the support tower may be configured in an upright position and a folder position. In another aspect, each of the stator blades comprise a stator blade trailing flap. In another aspect, each of the first rotor blades comprise a first rotor blade trailing flap. In another aspect, each of the set of main turbine blades are attached to the outer barrel stave. In another aspect, the wind turbine body further comprising a circular slat positioned adjacent the set of stator blades.

In yet another embodiment, a direct drive wind turbine generating electricity is disclosed, the direct drive wind turbine comprising: a wind turbine body comprising: a center body; a nose inlet; a wind turbine shaft defining a longitudinal axis of the wind turbine body; a stator assembly comprising a set of stator blades, each of the stator blades comprising a stator blade trailing flap; a diffuser augmenter cuff assembly comprising: a first rotor blade assembly configured to rotate about the longitudinal axis in a first axial direction and comprising an outer barrel stave coupled to a set of outer magnets, an inner barrel stave coupled to a set of inner magnets, and a set of first rotor blades, each of the first rotor blades comprising a first rotor blade trailing flap; a second rotor blade assembly configured to rotate about the longitudinal axis in a second axial direction opposite the first axial direction and comprising armature coils positioned between the set of outer magnets and the set of inner magnets, and a set of second rotor blades; an impeller assembly providing cooling to the set of outer magnets, the set of inner magnets, and the armature coils; a set of short turbine blades; a set of main turbine blades attached to the outer barrel stave; and a support tower affixed to the Earth and attached to the stator assembly and to the second rotor assembly; wherein: a first airflow is received by the nose inlet, at least some of the first airflow routed into the impeller assembly; a second airflow is received by the diffuser augmenter cuff assembly and channeled to form a channeled second airflow, the channeled second airflow routed to engage the first rotor blade assembly, to urge rotation of the first rotor blade assembly in the first axial direction, and to urge rotation of the second rotor blade assembly about the second axial direction; a third airflow is received by the set of outer magnets, the set of inner magnets, and the armature coils; a fourth airflow is received by: i) the set of short turbine blades to create a short turbine blade torque about the wind turbine shaft and to rotate the first blade assembly about the longitudinal axis, and ii) the set of main turbine blades to create a main turbine blade torque about the wind turbine shaft and to rotate the first blade assembly about the longitudinal axis; the diffuser augmented cuff assembly attaches to the set of main turbine blades at a distance between 20%-30% of the length of a particular main turbine blade operating radius; each short turbine blade is connected to a respective main turbine blade by way of a Y winglet; and rotation of the set of outer magnets and the set of inner magnets opposite to the rotation of the armature coils generates electricity.

The term "state" means a group of variables or characteristics that defines the condition of an entity, such as pressure and temperature may define the condition or state of a substance as a gas or a liquid.

The phrase "user interface" or "UI", and the phrase "graphical user interface" or "GUI", means a computer-based display that allows interaction with a user with aid of images or graphics.

By way of providing additional background, context, and to further satisfy the written description requirements of 35 U.S.C. § 112, the following references are incorporated by reference in their entireties: U.S. Pat. No. 7,633,176 Bittersdorf, U.S. Pat. No. 8,222,762 to Borgen; U.S. Pat. No. 7,944,074 to Longtin; U.S. Pat. No. 8,040,011 to Mueller; U.S. Pat. No. 9,926,906 to Mansberger; U.S. Pat. No. 10,280,895 to Keeley and U.S. Pat. No. 4,720,640 to Anderson; U.S. Pat. Appl. Nos. 2006/0163963 to Flores; and 2011/0001320 to Lagerweij; and EP 3,396,153 to Ostertag.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g., analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Figure 1:
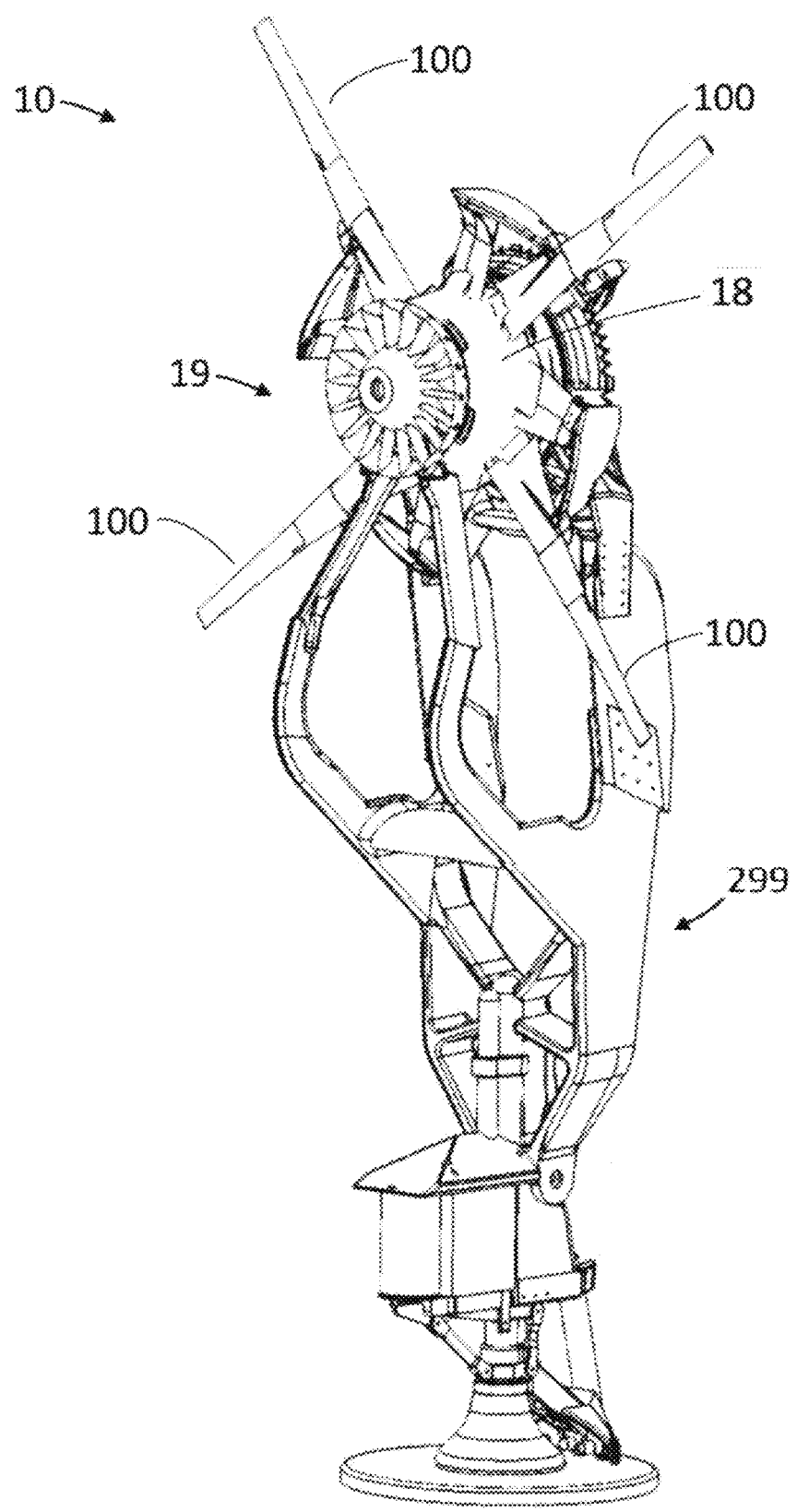
FIG. 1 is front left side isometric view of one embodiment of a direct drive wind turbine of the disclosure.

To assist in the understanding of one embodiment of the present invention the following list of components and associated numbering found in the drawings is provided.
Component
10 Direct Drive Wind Turbine System (aka Inner Diffuser Cuff Wind Turbine)
11 Wind Turbine Shaft (aka Rotor Shaft)
12 Center Body Nosecone
13 Nose Inlet
14 Slat Assembly
15 Forward Stator Blade
16 Stator Flap
17 Stator Bottom Strut
18 Diffuser Cuff Assembly
19 Wind Turbine Body
20 Stator Assembly
30 First Rotor Blade Assembly (aka Rotor A Assembly)
40 Second Rotor Blade Assembly (aka Rotor B Assembly)
100 Main Turbine Blade
101 Circular Fence
102 Short Blade
103 Y Winglets
104 Diffuser Cuff Forward Section
105 Generator Inlet
106 Rotor A Forward Blade
107 Rotor A Flap
108 Rotor A Structural Disc
109 Rotor A Core Insert
110 Angled Inlet Spacer
111 Outer Barrel Stave Plate
112 Outer Magnet
113 Inner Magnet
114 Inner Barrel Stave Plate
117 Rotor A Aft Core Insert
118 Roller Bearing
119 Thrust Bearing
120 Rotor A Ball Bearing Groove
121 Mini Blade Structural Stiffener
122 Brake Disc
123 Blade's U Channel Ring
124 Threaded Bolt for Blade's Root
125 Steel Strap Around Barrel Staves
200 Armature coils (aka Coil Windings)
201 Forward Coil Ring
202 Rotor B Loose Ball Bearing Groove
203 Steel Aft Ring
204 Rotor B Hi Lift Blade
205 Root Inlet for Impeller Flow Crossing Across Channel
206 Root Steel Plate
207 Impeller
208 Impeller Bearing Groove
209 Loose Ball Bearings (Alternating Diameters)
210 Connector to Slip Rings
211 Shroud Around Wiring
212 Non-Magnetic Steel Bolt
299 Support Tower Assembly
300 Aft Thick Support Strut (4 Total)
301 Aft Diffuser Cuff
302 Center Body Tail Cone
303 Aft Impeller Plate
304 Impeller Plate Groove
305 Aft Core Support
306 Slip Rings
307 Struts from Diffuser Cuff to Towers
308 Upper Airfoil Strut Between Twin Towers
309 Twin Towers
310 Lower Airfoil Strut Between Twin Towers
311 Mid Platform
312 Roller Bearings (4) into Support Struts
313 Tilt Axis
314 Diffuser Boost Airfoils
315 Y Yoke
316 Y Yoke Attachment to Air Shock
317 Bottom Platform
318 Electronics, Controls under Roof
319 Electrolyzer
320 Hydrogen Tank/Lower Tower
321 Oxygen Tank
322 Tank Wrap
323 Water Tank
324 Forward Brace
325 Aft Braces
326 Cylinder Alignment Slot
327 Air Shock Cylinder
328 Foundation Cap
329 Trailing Bogey
330 Yaw Control Motors (3) on wheel axles
331 Cradle with Moveable Crane or Gin Pole (Not Shown)
A Core Airflow Thru Nose Inlet and Into Impeller B Channel Airflow Between Diffuser Cuff and Streamlined Center Body
C Cooling Airflow into and Around Generator
D A's Impeller Flow that Transitions Across Channel through Rotor B's Hallow Blades
E Some of D's Airflow Exits out B's Suction Side for Improved Lift
W Incoming Wind

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-25.

Generally, a direct drive wind turbine system is disclosed. The wind turbine employs a diffuser cuff surrounding a counter rotating turbine operating inside a streamlined center body to provide to a more efficient and effective wind turbine system than conventional wind turbines. The counter rotating turbine is created by the oppositely rotating magnets of the first rotor assembly and the coil windings of the second rotor assembly. The direct drive wind turbine system may be referred to as "wind turbine," "inner diffuser cuff wind turbine," or simply as the "system." The method of use of the direct drive wind turbine system may be referred to simply as the "method."

Early wind turbines increased operating generator rpm's by placing heavy, costly and maintenance-prone transmission gears between the blades and the generator. Those gearboxes became impractical for wind turbines out in the ocean, along the seacoast. So, those transmissions have been generally abandoned for Direct Drive, regardless of recent improvements, by moving the active generator's radius further out from the axle. The disclosed direct drive wind turbine not only has the generator further out along the radius than recent direct drive generators but almost doubles the effective rotor speed interaction by moving the coils and magnets in the opposite direction. The best and most reliable method of creating counter rotation is the same way a jet engine operates. Jet engines are extremely reliable, if the hot sections stay within safe operating temperatures. Eliminating gears and replacing them with only aerodynamic forces means everything for reliability and operating life in a wind turbine. A wind turbine can operate 24/7 and millions of hours in all kinds of winds, while most engines only operate for a few hours at a time and overall, for thousands of hours. A counter rotating turbine can deliver the same work as an entire row of jet engine rotors, moving in the same direction, but with only a single stator stage and two counter rotating rotors.

The initial stator is attached to the stationary bullet nose, followed by an impulse rotor A and then a reactive Rotor stage B before directing the flow back axially, for minimum wake losses. Rotor B rotates, typically, at about 83% of the rotor A's rpm, but in the opposite direction from rotor A, because of upstream losses. Therefore, voltages and electrical powers are not quite double the typical wind generator's voltage and power, just from counter rotation.

Main wind turbine blades are supported out from Rotor A by supporting rods hidden within A's blades. Main turbine blades, along with Rotor A's channel blades, drive the inner and outer magnets inside the diffuser ring's thickest sections.

Rotor B drives the coils, moving in between the magnets, in the counterclockwise direction from Rotor A, looking from the front. Rotor B also drives a double-sided impeller, which draws air from the center body's nose. This compressed air exits out the hallowed-out Rotor B blades and joins up with cooling air from the heated coils before swinging out thru the turbine blades and the secondary short turbine blades with winglets. Ordinarily, waste heat off the coils is just thrown overboard. However, the impeller pulls much more air into the central inlet to sling it out radially and diffuse it out into larger volumes for greater pressures and energy with wasted heat. This energized air not only improves cooling considerably with more flows but also serves for creating blown lift out the suction side of the main turbine blades and the shorter turbine blades for additional torque enhancement.

The stator blades and rotor A blades have a large aft trailing flap with a gradual transition thru the flap gap to energize the flap's outer boundary layer. An airplane's wing flap must tuck back into the main wing for minimum cruise drag and thereby requires a short and contorted flap gap. However, a wind turbine operates continuously in low winds, which allows a larger flap to remain extended with an ideal flap gap shape. For both the initial stator and Rotor A's rotor, the forward airfoil section smoothly directs the incoming flow into the flap gap for a final exit turn across the flap's upper surface to prevent separation.

With attention to FIG. 1, a direct drive wind turbine 10 comprises a wind turbine body 19 comprising a center body, a diffuser cuff assembly 18, a set of main turbine blades 100, and a support tower assembly 299.

A conventional wind turbine using a typical diffuser augmenter positions the diffuser out around the blade tips. In contrast, the direct drive wind turbine system 10 of the disclosure places the diffuser cuff close around a streamlined center body, to form a highspeed channel in between.

As briefly described above, the diffuser cuff assembly 18 is positioned near a center body nosecone 12 (of a center body) of the streamlined wind turbine body 19 to form a highspeed channel which powers a counter rotating turbine. The counter rotating turbine has a stator section out front to set up two rotors moving in opposite directions. The first rotor (of a first rotor assembly aka rotor A assembly) assists or urges the wind turbine blades (both the set of main turbine blades 100 and the set of short turbine blades 102) in a first one axial direction and the following rotor (of a second rotor assembly aka rotor B assembly) in a second axial opposite direction, the second axial direction opposite to the first axial direction. Because the two rotors are rotating in opposing directions, the relative speed between the two has nearly doubled. A radial flux generator (comprising a set of outer magnets 112, a set of inner magnets 113, and armature coils 200 aka coil windings) is positioned inside the chord of the diffuser ring aka diffuser cuff. The set of inner magnets 113 and the set of outer magnets 112 are attached, to corresponding "barrel staves" on the Rotor A assembly section, with the main turbine blades, while the armature coils are on Rotor B's assembly. Air flow from the nose inlet is compressed from Rotor B's impeller to force cooling air around the generator.

A conventional direct drive wind turbine may eliminate the transmission gear box by moving the generator's active area from around the rotor out to a larger radius, comparable to the nacelle's outer perimeter. In contrast, the direct drive wind turbine system 10 of the disclosure moves the active radius even further outboard to completely remove the ineffective round root blade sections. This configuration removes the root trailing vortices and much of the wake losses.

A conventional direct drive wind turbine typically positions an armature to rotate directly off the rotor. Clearances between the rotor and stator must be extremely tight for the generator to operate efficiently. Moving the active generator outboard for direct drives meant that inactive structures needed to be tremendously strengthened to maintain those tight clearances across those empty air gaps. Supporting these much longer structural arms off the rotor from smashing into each other was alleviated by taking out the strong electromagnetic attractions locally. (It is like holding in the same position with your thumb across from the fingers in comparison to both arms stretched out holding those same forces, while spinning). In contrast, the direct drive wind turbine system 10 of the disclosure maintains tight clearances locally between inner and outer "barrel staves" which are cantilevered off angled spacers. The outer barrel staves or iron beveled plates provide not only a way to greatly increase magnetic field but a bypass route around the inner critical clearances for nearly all the main turbine blades' loads. Instead of those loads going across the generator, they are transferred directly aft across a bearing raceway full of loose ball bearings into Rotor B. Rotor B transfers the loads thru ball bearings into each of the four large aft struts. The spread out loads around the aft diffuser cuff are then combined into just the bottom large aft struts for transmission down the twin support towers. Note that the four large struts transfer blade loads directly around and into the twin towers (See FIG. 9), while adding significant volume out behind the diffuser cuff to help reduce expansion and inner surface separation.

A conventional wind turbine employs a typical generator comprising a rotor armature and a stator field or a stator armature and a rotor field. In contrast, the direct drive wind turbine system 10 of the disclosure uses a counter rotating turbine which has both the field and armature moving in opposite directions. This means the relative speed between the two rotors can almost be doubled without any upstream flow losses. If the relative speed becomes doubled, that means the generator's voltage and power may also be doubled.

The direct drive wind turbine 10 solves, among other things, the three-dimensional unsteady flow losses issue throughout the central swept area that obstructs slipstream flows and optimum power generation of electricity. This issue is common in conventional wind turbines. The inner diffuser cuff assembly 18 draws more flow into the middle channel area formed around the aerodynamically shaped center body. Channel flows are moving nearly five times the incoming wind speeds, which approaches tip speeds over the outer productive blade span. Such higher speeds justify using the counter rotating turbine blades (the set of first rotor blades of the first rotor blade assembly and the set of second rotor blades of the second rotor blade assembly) inside the channel. (In one embodiment, the set of first rotor blades and/or the set of second rotor blades are manufactured using 3D printing techniques or technology). Rotor A blades drive the magnetic fields clockwise and assist or urge or provide main turbine blade torque. Rotor B blades drive the armature 200 counterclockwise for nearly double relative speeds. Thus, most losses from the root trailing vortices, nacelle wake and diffuser separation bubble are eliminated. The central flows are used instead to improve power while preventing overheating with forced cooling air.

With particular attention to FIGS. 1-3 and 19-20, a direct drive wind turbine 10 comprises a wind turbine body 19 (aka center body), a set of short turbine blades 102, a set of main turbine blades 100, and a support tower assembly 299. The wind turbine body 19 comprises a nose inlet 13, a wind turbine shaft 11, a stator assembly 20, an impeller 207, and a diffuser augmenter cuff assembly 18. The wind turbine shaft 11 defines a longitudinal axis of the wind turbine body 19.

The bullet shaped wind turbine body replaces the boxy and high-drag nacelle of conventional wind turbines. The center body is shaped for minimum drag; the special bullet shape also assures constant speeds through most of the mid sections. The design also eliminates large flow disruptions and turbulence with a gradual aft decrease in volume behind a typical wind turbine's nacelle box. The streamlined wind turbine body 19 also has a nose inlet 13 that provides airflow into the impeller 207, the impeller driven by the second rotor assembly.

The diffuser augmenter cuff assembly 18 comprises a first rotor blade assembly 30 rotating about the longitudinal axis in a first axial direction and a second rotor blade assembly 40 rotating about the longitudinal axis in a second axial direction, the second axial direction opposite the first axial direction. For example, in one embodiment, when facing the front of the wind turbine body (which receives airflow, such as wind airflow), the first axial direction is a clockwise axial direction, and the second axial direction is a counterclockwise axial direction. In another embodiment, the first axial direction is a counterclockwise axial direction, and the second axial direction is a clockwise axial direction.

The diffuser cuff, positioned just outboard of the center body, draws more wind in between the bullet and diffuser ring. The diffuser ring also smooths out wind gusts and further accelerates local flows around the largest bullet diameters of center body designs; the cuff acts like a concentric wing curled around the bullet, with the suction side next to the center body. Because blade lift is proportional to speed squared, total lift increases within the channel more than 25 times for typical incoming winds. Furthermore, the diffuser cuff is considerably smaller than all other diffuser augmenters, with much less weight. The cuff is mounted near the center instead of outside the blade tips. The augmented diffuser cuff is positioned around 23 percent of the tip radius instead of 100%, and yet draws extra wind inside, while the diffuser cuff's downstream influence extends even as far out past the blade tips. In some embodiments, the cuff is positioned between 20-30% of the tip radius.

Note that acceleration in the diffuser cuffs channel occurs significantly upstream from where the wind's streamlines are "parallel" to a very short distance past the leading edge on the diffuser's nose. The streamlines gradually narrow down with increasing speeds until the minimum pressure point on the suction side (inside diffuser cuff for a diffuser or topside on a wing). This occurs, for a diffuser angle of attack of about zero, within about 23% of the chord length of a high lift airfoil and at about 5% for a diffuser angle of attack closer to stall angles. The angle of attack is with respect to the relative wind. At the high angle for diffusers, this minimum pressure point moves further upstream. Now that the transition in the boundary layer has gone from laminar flow to turbulent flow and the pressures along the "wing" surface are increasing in the direction of flow, the flow may become susceptible to reversing and possible separation. The diffuser angle is the angle from the leading edge to the trailing edge point. The slat of the wind turbine functions, among other things, to reduce the effective diffuser angle with less risk of separation. The slat also adds more inlet flow and more energy air around the nose of the basic diffuser. As such, the gradual volume increase of the center body influences the channel airflow speeds to stay reasonably constant, instead of slowing down, at least until Rotor B's blades have been passed. In one embodiment, Rotor A's blades rotate around 30% and Rotor B's blades rotate back around 50% of the diffuser cuffs chord length.

The first rotor blade assembly 30 comprises an outer barrel stave coupled to a set of outer magnets 112, an inner barrel stave coupled to a set of inner magnets 113, and a set of first rotor blades. The second rotor blade assembly 40 comprises armature coils 200 positioned between the set of outer magnets 112 and the set of inner magnets 113, and a set of second rotor blades.

Figure 10:
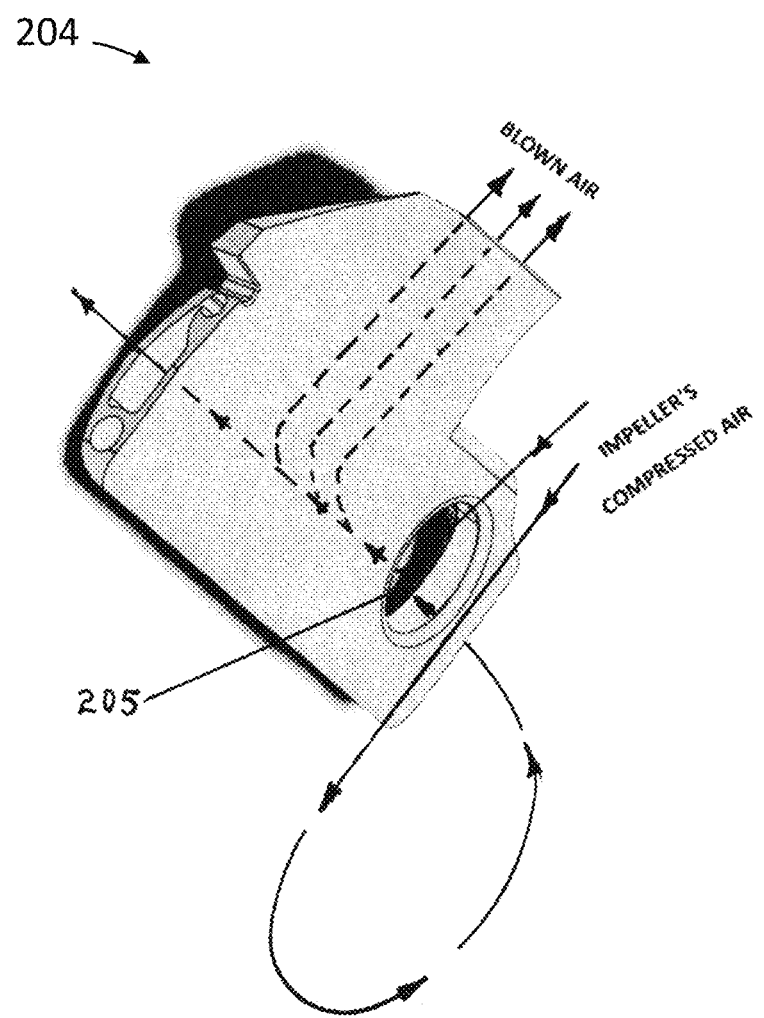
FIG. 10 is a perspective view of the impeller component of the direct drive wind turbine of FIG. 1, illustrating airflows through Rotor B's blade.

The impeller 207 is driven by the second rotor blade assembly 40 to compress airflow received from the nose inlet; the compressed airflow is passed by the armature coils 200, the set of outer magnets 112 and the set of inner magnets 113 (collectively, the "generator") to provide cooling. (See FIG. 10, showing one rotor B lift blade with airflows into its hallow cavity). The impeller's pressurized air is used for forced air cooling, blowing air over blade root sections, and to energize diffuser cuff exit pressures. This impeller airflow, that turns aft, accelerates out the four large support struts near the cuff's exit plane to lower exit static pressures and draw in more channel flow to avoid inner diffuser surface separation when diffuser expansion may be excessive.

Note that the impeller is powered by Rotor B's hi lift airfoil blades because the blades align up with the exit vector coming off Rotor A. The impeller pulls more air into the core because it is drawn by the impeller slinging that airflow radially outward. However, the channel airflow primarily is drawn in because of the diffuser cuff acting like a circular shaped airfoil wing, where the highest airspeeds occur on the topside of a wing. The highest airspeeds for the cuff are inside of the cuff. The main turbine blades are helping to "accelerate" the channel flow only by slightly speeding up the rotation, since the main blades are on the same rotor A. An impeller really accelerates the core inlet's airflow so that when it slows down inside the larger volumes radially it creates much higher pressures for forced cooling air. The higher pressures are energized by wasted heat from the coils for higher speeds and better cooling.

The set of short turbine blades 102 are attached or coupled to the first rotor blade assembly 30 and thus rotate in concert with the rotation of the first rotor blade assembly 30. The set of main turbine blades 100 are also attached or coupled to the first rotor blade assembly 30 and thus rotate in concert with the rotation of the first rotor blade assembly 30. Each of the short turbine blades 102 are connected or coupled to a respective main turbine blade 100 by way of a circular fence 101 and Y winglets 103.

Note that both sets of main turbine blades are attached directly to steel barrel staves that increase the electromagnetic flux for the magnets. The vast majority of loads (of the turbine blades) run aft directly into a groove at the end of the outer staves, through loose ball bearings, into rotor B's groove, then over into four ball bearings on each large strut, transfers loads around the aft diffuser cuff into just two bottom struts, then into the mid platform to pick up forward shaft loads, and down into twin aerodynamic towers to the yaw platform, then into the ground. (See FIG. 9). Thus, the blade loads skirt around the generator and do not require as much structural weight across a generator's tight clearances (as is typical in conventional wind turbines).

The loads from the main turbine blades are split out into the short turbine blades. That is, short blades, with Y winglets, are positioned behind the long main blades to prevent root vortices from curling around to the main blade's suction side and to help support the main blades across a circular fence. The fence serves as an end plate to the Y winglets and to stop any early spanwise flow out to the main blade's tip.

In one embodiment, the set of short turbine blades 102 and the set of main turbine blades 100 are each four in quantity. In one embodiment, the set of short turbine blades 102 and the set of main turbine blades 100 are each the same in quantity, e.g., three, four, five, six, etc.

The support tower 299 is affixed to the Earth and attached to the wind turbine body 19, as described in more detail below.

With particular attention to FIGS. 19 and 20, one method of operation 2000 of the embodiment of the direct drive wind turbine 10 of FIG. 1 will be described. The method 2000, and FIGS. 19A-B, emphasizes the set of airflows within, near, and adjacent the direct drive wind turbine 10. More specifically, details of the set of airflows relative to components of the wind turbine body, short wind turbine blades, and main wind turbine blades are described.

Figure 19A:
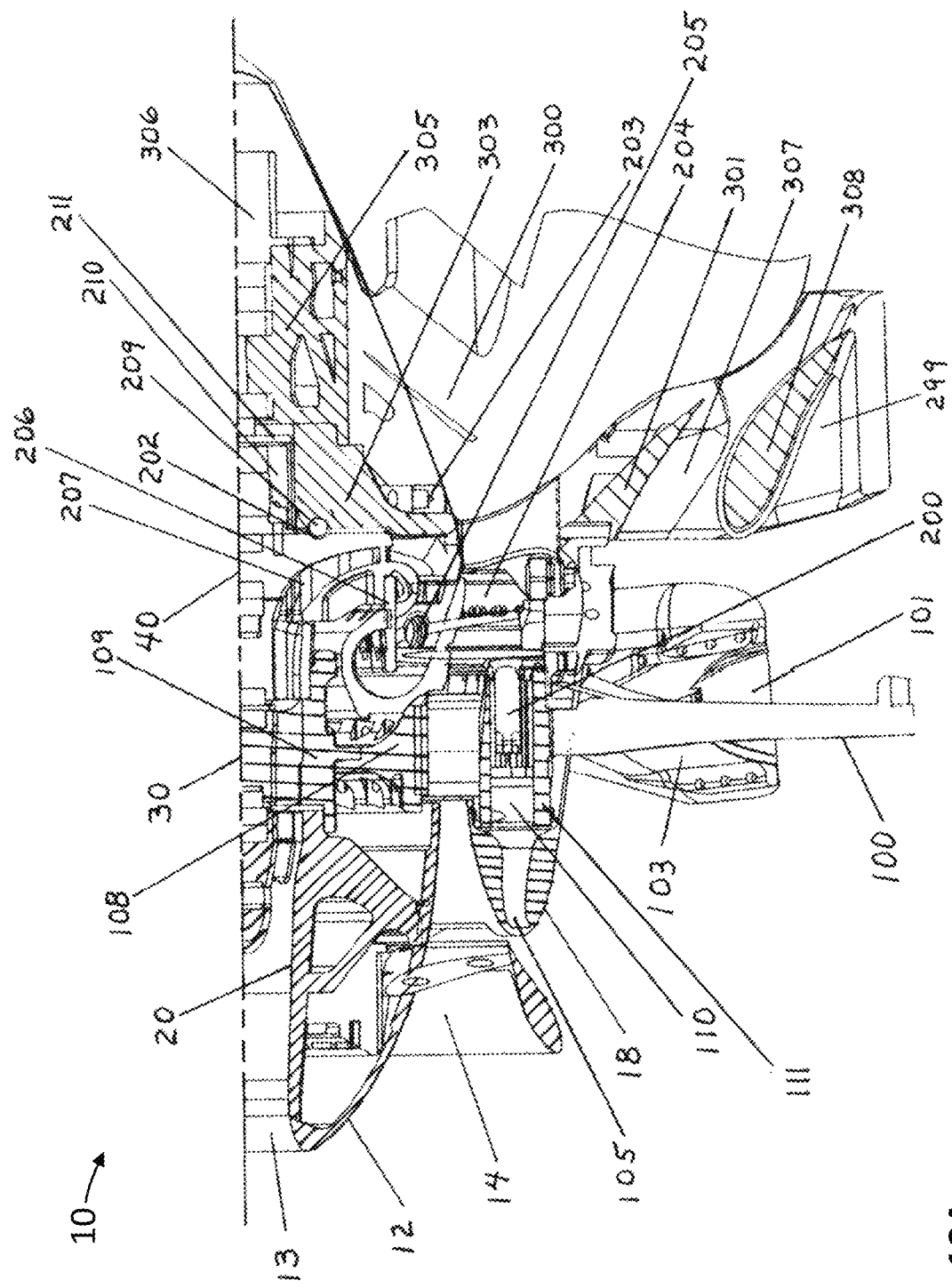
FIG. 19A is a cutaway partial left side view of some components of the direct drive wind turbine of FIG. 1.
Figure 19B:
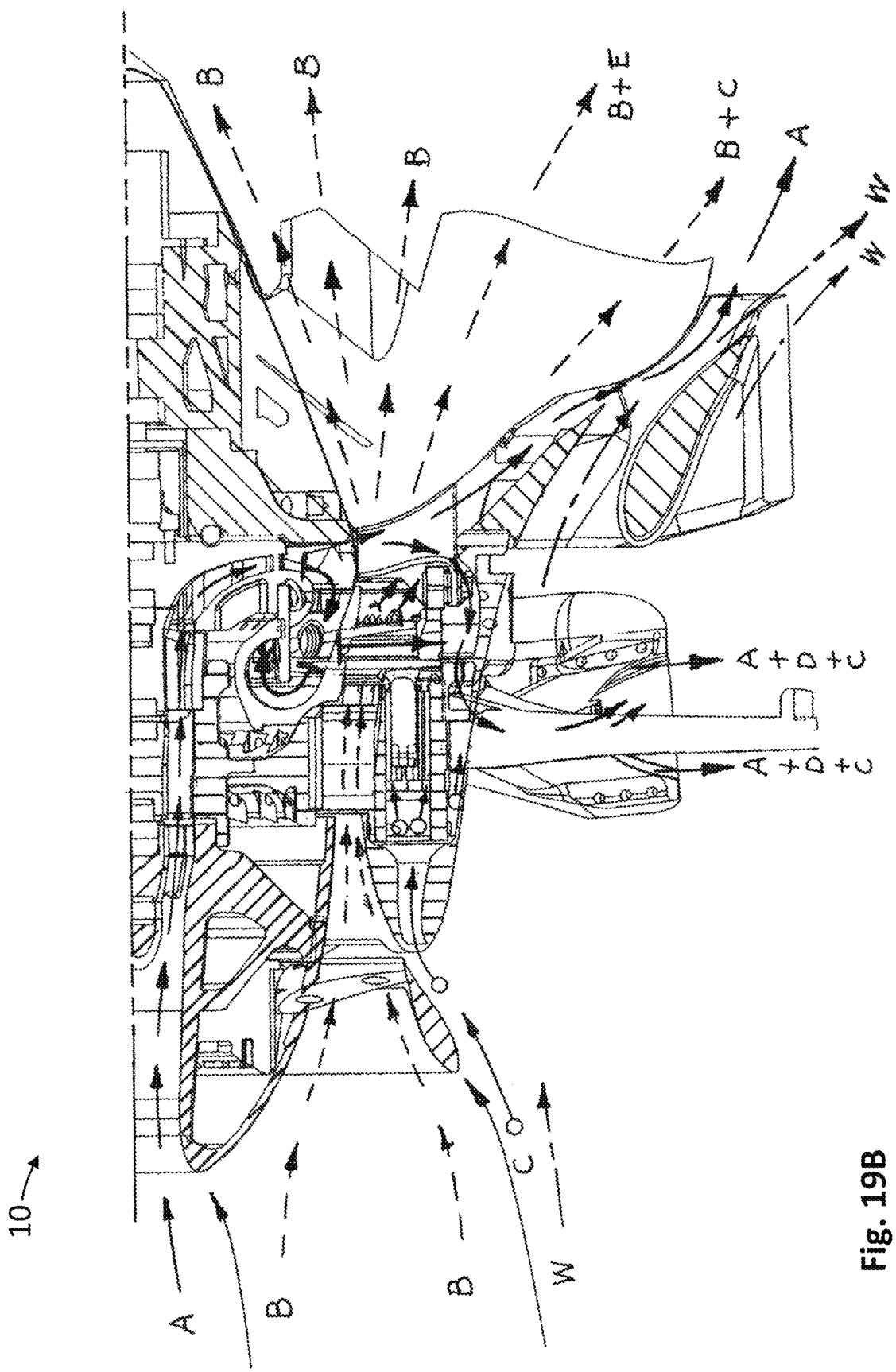
FIG. 19B is the cutaway partial left side view of some components of the direct drive wind turbine of FIG. 19A, detailing a set of airflows relative to components of the wind turbine body, short wind turbine blades, and main wind turbine blades.

Note that FIGS. 19A-B are cutaway partial left side views of some components of the direct drive wind turbine of FIG. 1, as viewed at a 45-degree angle of rotation (about the longitudinal axis) and cut through the aft support strut.

Figure 20:
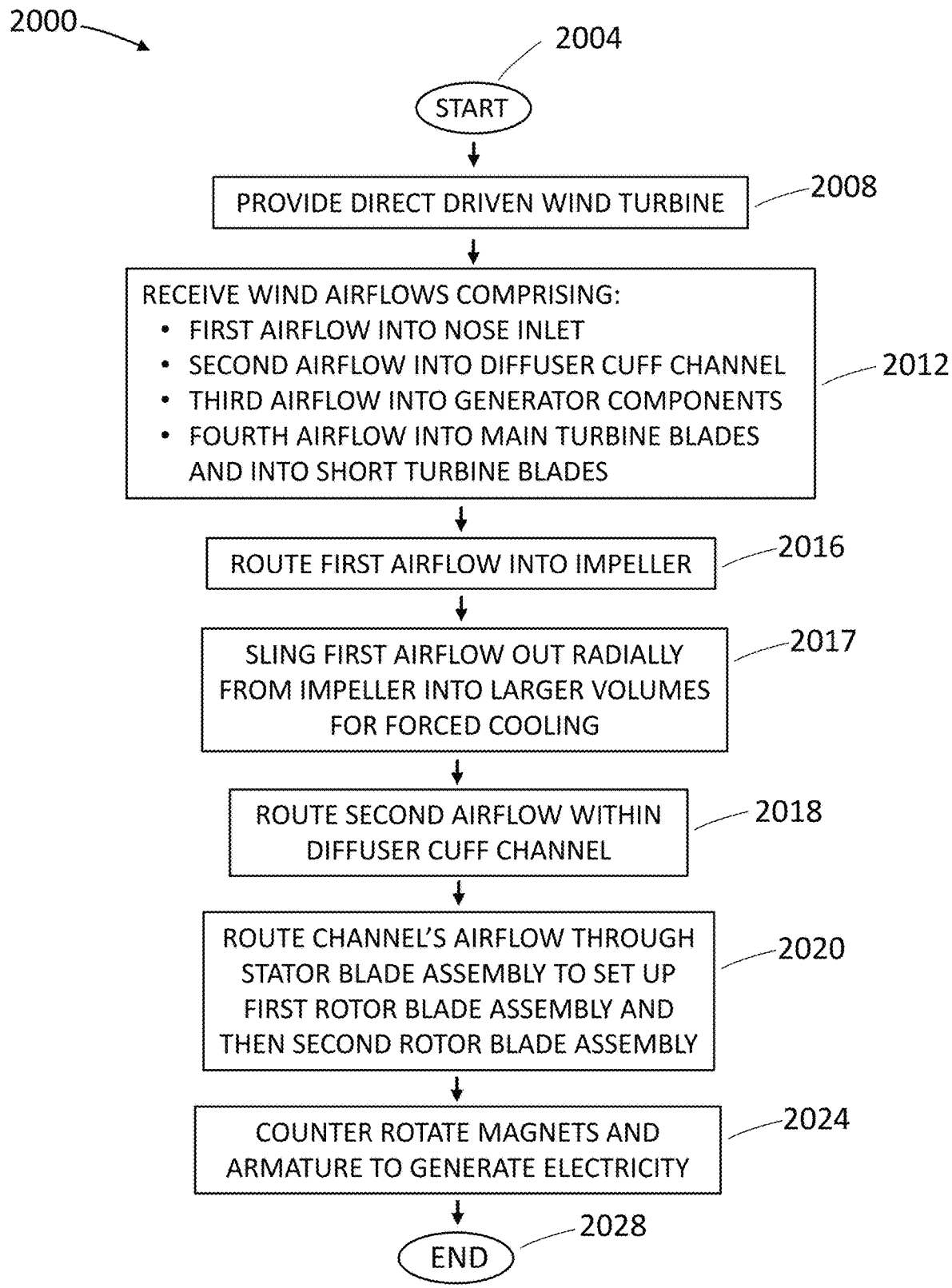
FIG. 20 is one method of use of the embodiment of a direct drive wind turbine of FIG. 1.
Figure 21:
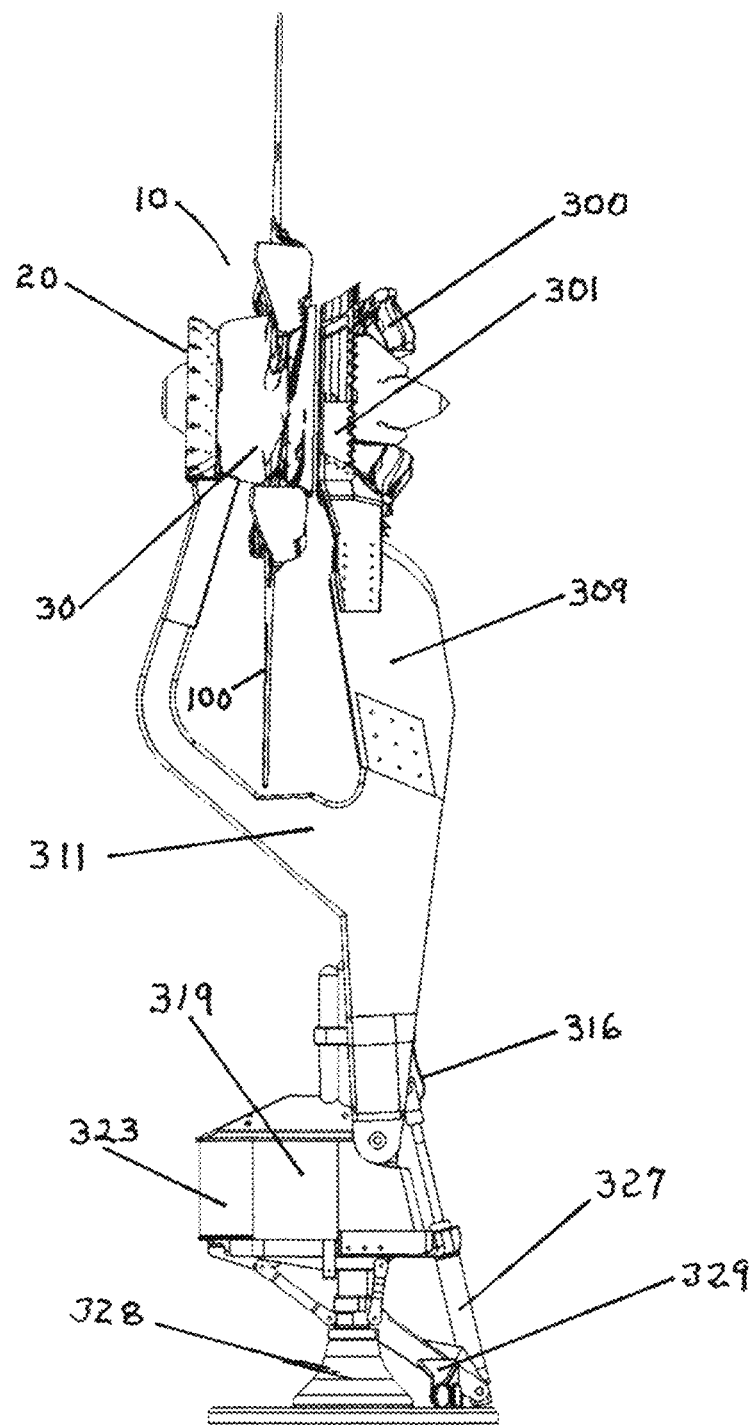
FIG. 21 is a left side view of the direct drive wind turbine of FIG. 1, detailing support tower components.

The flow diagram of FIG. 20 presents one method 2000 of using or operating the direct drive wind turbine system, such as the direct drive wind turbine system 10 of FIG. 1.

Generally, the method 2000 of FIG. 20 starts at step 2004 and ends at step 2028. Any of the steps, functions, and operations discussed herein can be performed continuously and automatically. In some embodiments, one or more of the steps of the method of use 2000, to include steps of the method 2000, may comprise computer control, use of computer processors, and/or some level of automation. The steps are notionally followed in increasing numerical sequence, although, in some embodiments, some steps may be omitted, some steps added, and the steps may follow other than increasing numerical order. When the method references a user, the user may be a single user or a set of users that coordinate requirements that are provided to the system. A user may interact or perform or assist with one or more of the described steps by using one or more user electronic device(s) comprising a display/GUI, to include a smartphone or other portable electronic device, and/or a desktop electronic device. The one or more user electronic device(s) may comprise an app to enable user interaction with the system. For example, a user may set a rotation maximum speed for the wind turbine main/short turbine blades, or a maximum temperature for one or more internal components (e.g., the generator), and effect control of one or more elements of the wind turbine 10 to not exceed the rotation maximum speed and/or the generator maximum temperature. (As such, the direct drive wind turbine system may include a controller and/or processor to affect such control law algorithms and/or techniques).

The method 2000 begins at step 2004 and proceeds to step 2008. At step 2008, a direct drive wind turbine system 10 is provided. The direct drive wind turbine system 10 may be that of FIG. 1 and any combination of components, elements, embodiments, and/or configurations of this disclosure. The direct drive wind turbine system 10 may be described with reference to any of FIGS. 1-19 and 21-25. After completion of step 2008, the method 2000 proceeds to step 2012.

At step 2012, the direct drive wind turbine system 10 receives a set of airflows. The set of airflows may include one or more of: a first airflow, a second airflow, a third airflow, and a fourth airflow. The first airflow, shown as airflow A in FIG. 19B, is received along the longitudinal axis of the direct drive wind turbine system 10. The first airflow is received by the nose inlet 13 and travels along the path depicted in FIG. 19B. At least some of the first airflow is received by the impeller 207 (at step 2016). The impeller slings the first airflow out radially into larger volumes for forced cooling (at step 2017). The remainder of the first airflow travels through the wind turbine body and engages the main turbine blades.

The second airflow, shown as airflow B in FIG. 19B, is received in a cavity or aperture or void or channel formed between an exterior of the center body nosecone 12 and the exterior of the diffuser cuff (at or near or adjacent the diffuser cuff forward section 104). The second airflow is received by the diffuser augmenter cuff assembly and routed into the diffuser cuff channel to form a channeled second airflow, the channeled second airflow routed to engage the first rotor blade assembly to urge rotation of the first rotor blade assembly in the first axial direction and to urge rotation of the second rotor blade assembly about the second axial direction (at step 2020). Note that the first rotor blade assembly rotates about the longitudinal axis in a first axial direction and comprises an outer barrel stave coupled to a set of outer magnets, an inner barrel stave coupled to a set of inner magnets, and a set of first rotor blades. Also, the second rotor blade assembly rotates about the longitudinal axis in a second axial direction opposite the first axial direction and comprises armature coils positioned between the set of outer magnets and the set of inner magnets, and a set of second rotor blades.

The third airflow, shown as airflow C in FIG. 19B, is received by the generator (as defined above, the generator comprises the set of outer magnets 112, the set of inner magnets 113, and the armature coils 200). The third airflow, among other things, serves to provide cooling to the generator. Stated another way, the third airflow is in thermal communication with one or more generator components.

The fourth airflow, shown in FIG. 19B as airflow W, is received by: i) the set of short turbine blades to create a short turbine blade torque about the wind turbine shaft and to rotate the first blade assembly about the longitudinal axis, and ii) the set of main turbine blades to create a main turbine blade torque about the wind turbine shaft and to rotate the first blade assembly about the longitudinal axis (at step 2020). After the completion of the above steps 2012, 2016, 2017, 2018, and 2020, the method 2000 proceeds to step 2024.

At step 2024, the rotation of the set of outer magnets 112 and the set of inner magnets 113, both as attached to the rotating first rotor blade assembly, in the opposite axial direction to the armature coils positioned between the set of outer magnets and the set of inner magnets (the armature coils attached to the second rotor blade assembly, generates electricity. At the completion of step 2024, the method proceeds to step 2028 and ends.

Note that the diffuser augmenter provides a number of benefits and functions, such as: A diffuser augmenter can significantly reduce the inner exit static pressures since the circular airfoil expands to a much larger exit area than the stagnation point on the nose of the diffuser. However, the ratio of exit shroud or cuff exit area to nose inlet area cannot be overly aggressive or else the inner flows will separate. This diffuser cuff works in harmony with the center body, unlike tip mounted diffuser augmenters. Those tip mounted diffusers create enough suction out near the large shroud exit to draw inner flows off the nose of the boxy nacelle. In contrast, a diffuser cuff is wrapped tightly around a bullet shaped nose to accelerate the channel speeds in between for both the first and second rotor blades up near five times the incoming wind speed. The dynamic pressures in the counter rotating turbine section are therefore around 25 times higher than out front. The velocities from the last stage come off directly aft in the axial direction for maximum through flow. The four large structural struts assure there is sufficient volume near the cuff exit to avoid inner diffuser separation. The gradual volume reduction of the aft center body assures avoidance of inner airflow separation off the center body.

Winds will just take the easiest path around a wind turbine if the losses become too large thru the stream tube formed by the turbine's tip radius. Maximum power, based on the Betz limit, occurs when $\frac{1}{3}^{rd}$ of the wind speed drop happens out front and $\frac{1}{3}^{rd}$ wind speed reduction is matched out back. A typical wind turbine has 10 to 12% losses from the round root sections of the turbine blades, boxy nacelle, and round tower next to the spinning blades.

Losses are minimized not only internally with the diffuser cuff but externally too. The cylinder-shaped root sections on a typical wind turbine transitions from the hub on the axle over to a reasonable airfoil section near the 25% tip radius. In the interim, huge alternating vortices shed off the back sides and are influenced to move around to the blade's suction side. This happens especially near stall speeds when wind speeds approach 10 to 11 meters/sec. Then those vortices easily shed radially outward toward the blade tips. The diffuser cuff eliminates all those round root sections by the blades attaching directly to the diffuser's outer surface. More boundary layer stability happens around this new root location since the outer diffuser surface is enlarging and slowing the local wind down. The short turbine blades trail behind the long blades to help structurally stiffen those thin main blades and to block any root wake from wrapping around to sweep any stalled flows out towards the blade tips. Before blade stalling, the root trailing vortices eventually meet up with the tip trailing vortices way downstream to partially block the stream tube flow. The diffuser cuff configuration minimizes any root trailing vortices that could expand into the tip trailing vortices or cause widespread shedding across the suction side of stalled blades.

Note that the above method 2000 has been simplified. Many components of the direct drive wind turbine system 10 have been omitted for clarity, for example. Additional components of the direct drive wind turbine system 10 are described in other portions of the disclosure.

Also, the routing and function of the airflows just described have been simplified. For example, the four airflows typically are part of a generalized wind blowing or moving toward the direct drive wind turbine system 10. Stated another way, the collection of airflows A, B, C, and W are initially (meaning prior to engaging the direct drive wind turbine system 10) part of one airflow.

With focus on FIG. 19, more detail as to the entering or received airflows A, B, C, and W will now be described. Airflow A is depicted as a solid-lined arrow. Airflow B is depicted as a dashed-lined arrow. Airflow C is depicted as a solid-line arrow with origination shown as an open circle. Airflow W is depicted as a solid-lined arrow interrupted by a short dash.

As discussed above, the first airflow is received by the nose inlet 13 and travels along the path depicted in FIG. 19B. At least some of the first airflow out of the impeller 207 is depicted in FIG. 19B as airflow D, that circles around to jump across the channel through the hallowed out Rotor B blade. A portion of the impeller flow, as received by the first airflow (airflow A), transitions through the hallow blades of the set of second rotor blades (of the second rotor blade assembly). Some of D's airflow exits out the suction side of Rotor B's blade as airflow E in FIG. 19B to energize the lift. The remainder of the first airflow from the impeller travels through the wind turbine body toward the outside of the wind turbine body and engages with the upper airfoil strut 308 and specifically with the side diffuser boost airfoils 314. The combination of the impeller's pressurized air with airfoil 314's suction side helps to greatly enhance the suction at the diffuser cuff exit and pull in even more airflow W.

The second airflow is received by the diffuser augmenter cuff assembly and routed to form a channeled second airflow. The stator blades in the stator assembly take the incoming wind and turn the flow so it is primarily moving in the circumferential direction. After engaging the first rotor blade assembly and the second rotor blade assembly (to urge rotations in opposite directions), the second airflow travels out through the rear or aft portion of the wind turbine body, combining with, at some portions, airflow E (of FIG. 19B). Generally, the final velocity out of rotor B is straight back for highest air throughflows.

The third airflow, shown as airflow C in FIG. 19B, after providing cooling for the generator, passes through the lower portion of the wind turbine body (combining with airflows A and D as shown in FIG. 19B) and/or passes through the aft portion of the wind turbine body (combining with airflow B as shown in FIG. 19B).

The fourth airflow, shown in FIG. 19B as airflow W, which engages each of the set of short turbine blades and the set of main turbine blades, and may also combine in synergy with airflow A to lower diffuser cuff exit static pressures.

Figure 2:
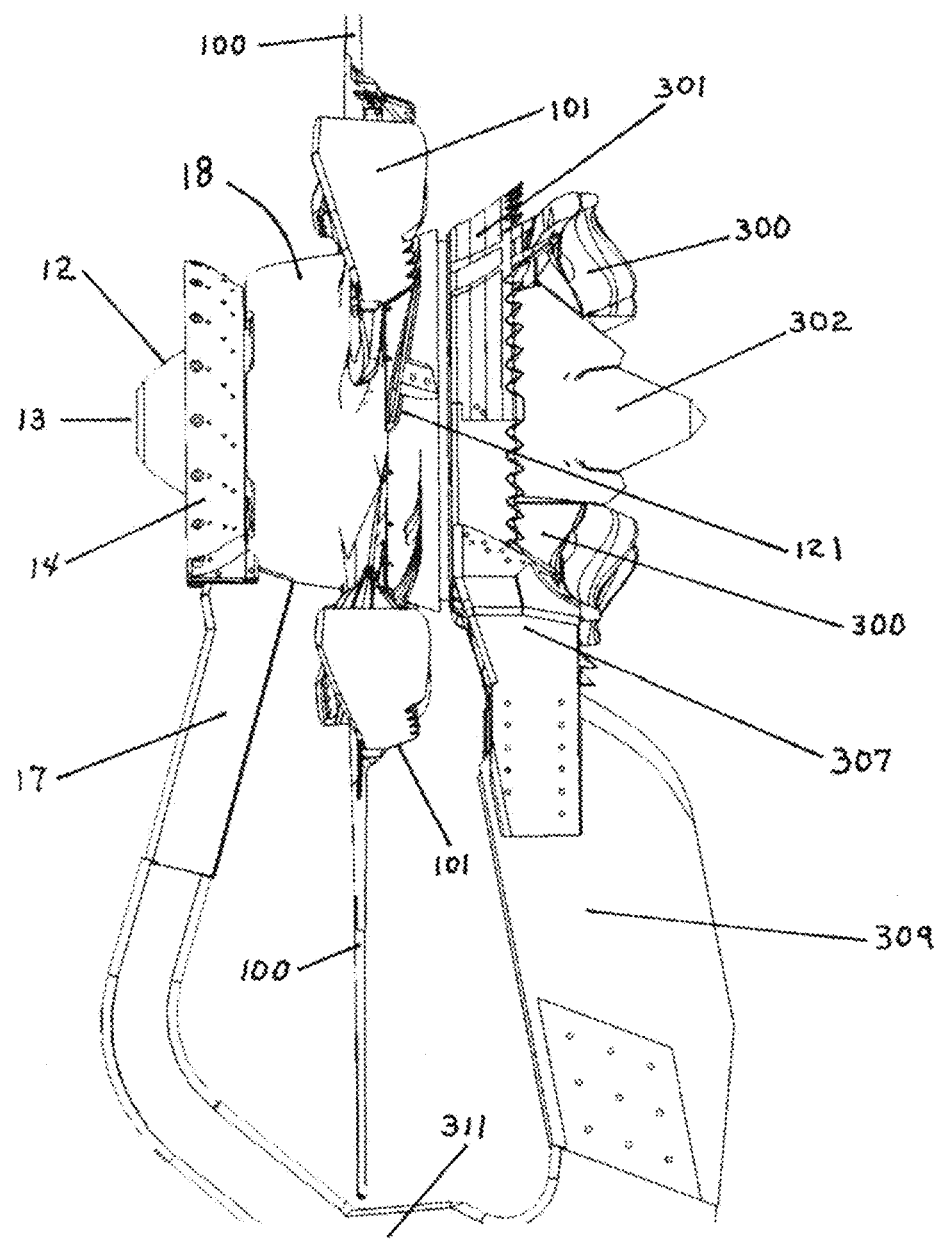
FIG. 2 is a partial left side view of the direct drive wind turbine of FIG. 1.
Figure 3:
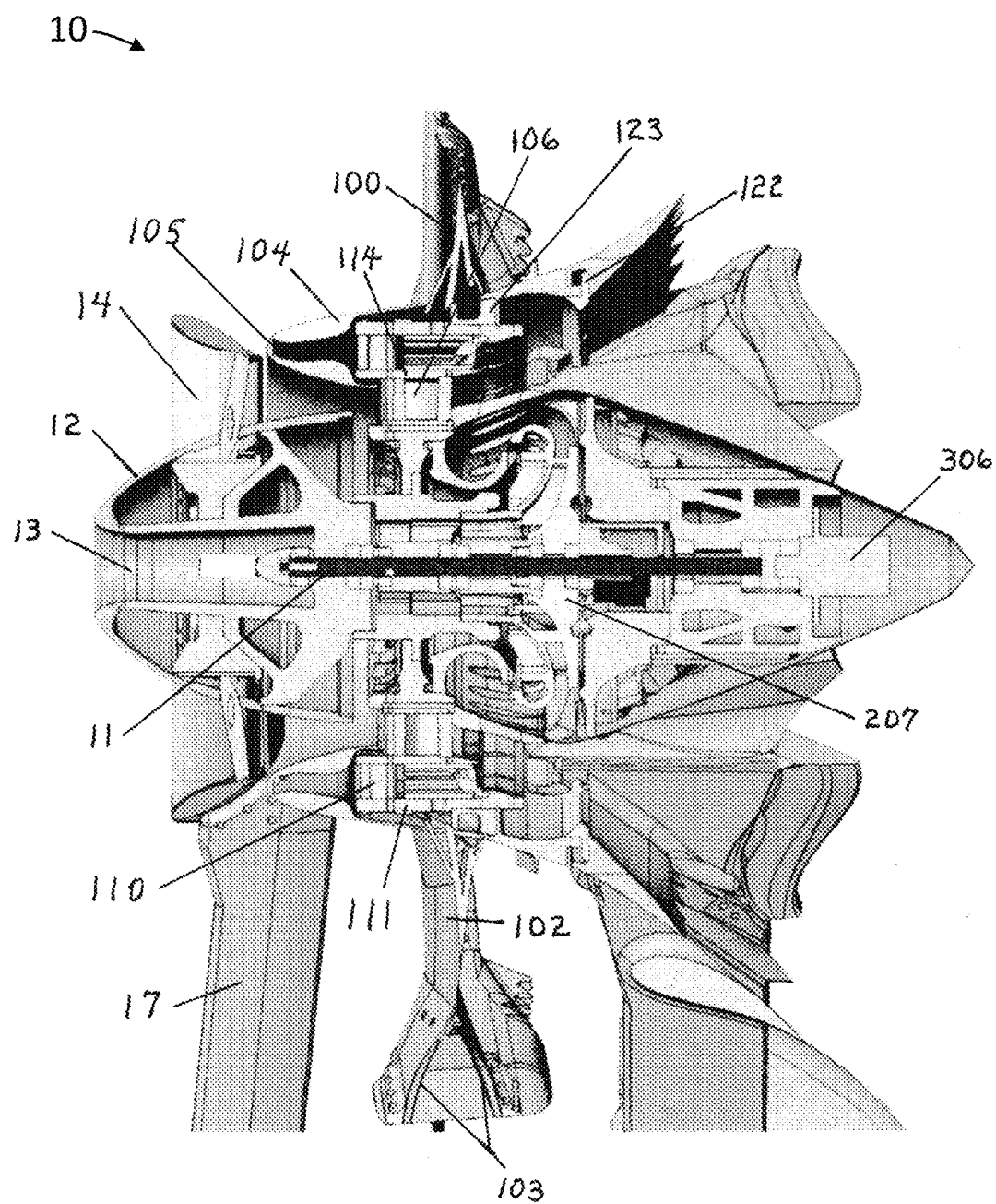
FIG. 3 is a cutaway left side view of the direct drive wind turbine of FIG. 1.
Figure 4:
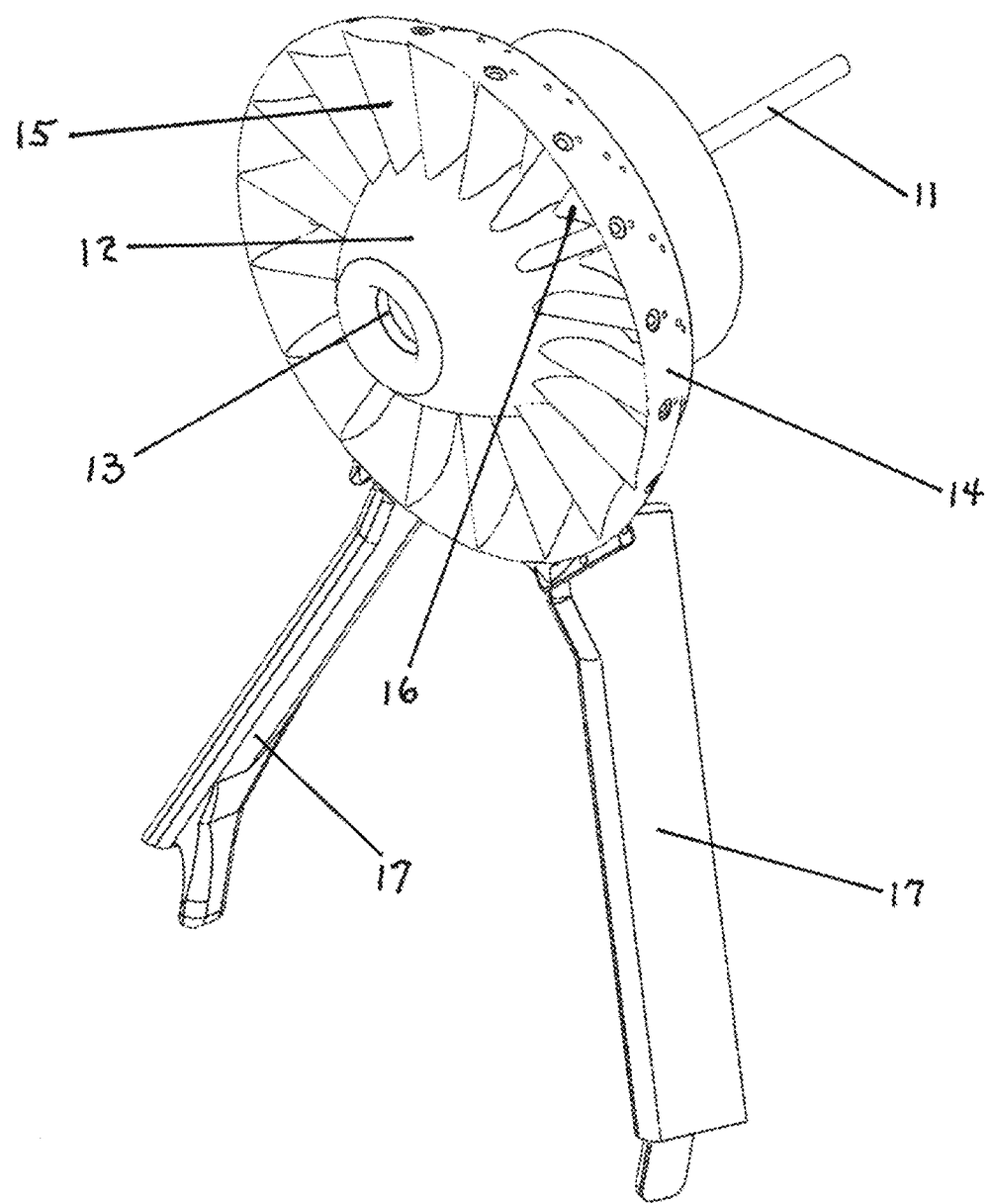
FIG. 4 is a front left side view of some components of the direct drive wind turbine of FIG. 1, detailing the Stator Assembly, which includes the first stage of the counter rotating turbine.
Figure 5:
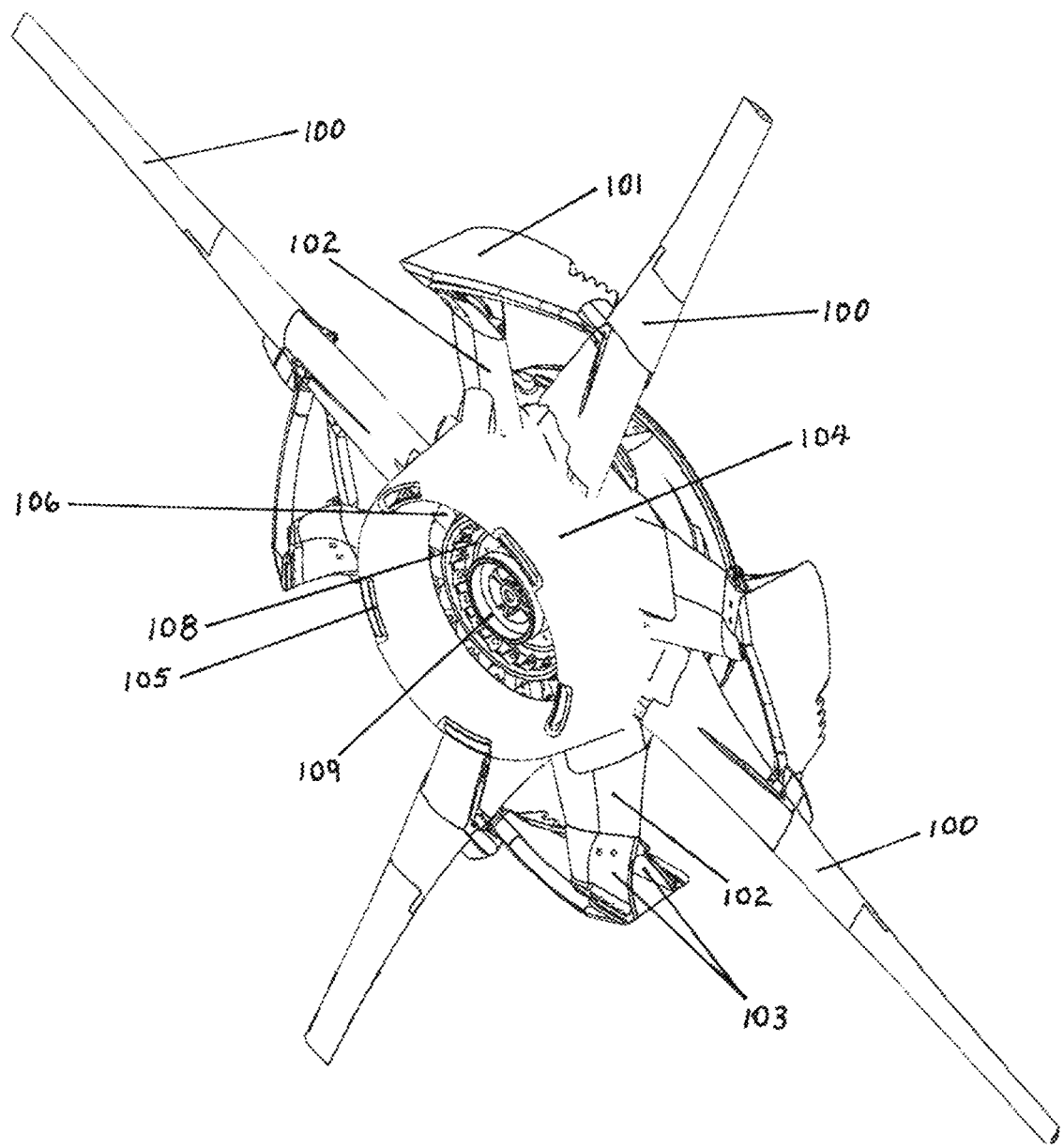
FIG. 5 is a front left side view of some components of the direct drive wind turbine of FIG. 1, detailing the diffuser cuff, main wind turbine blades, and short turbine blades.
Figure 6:
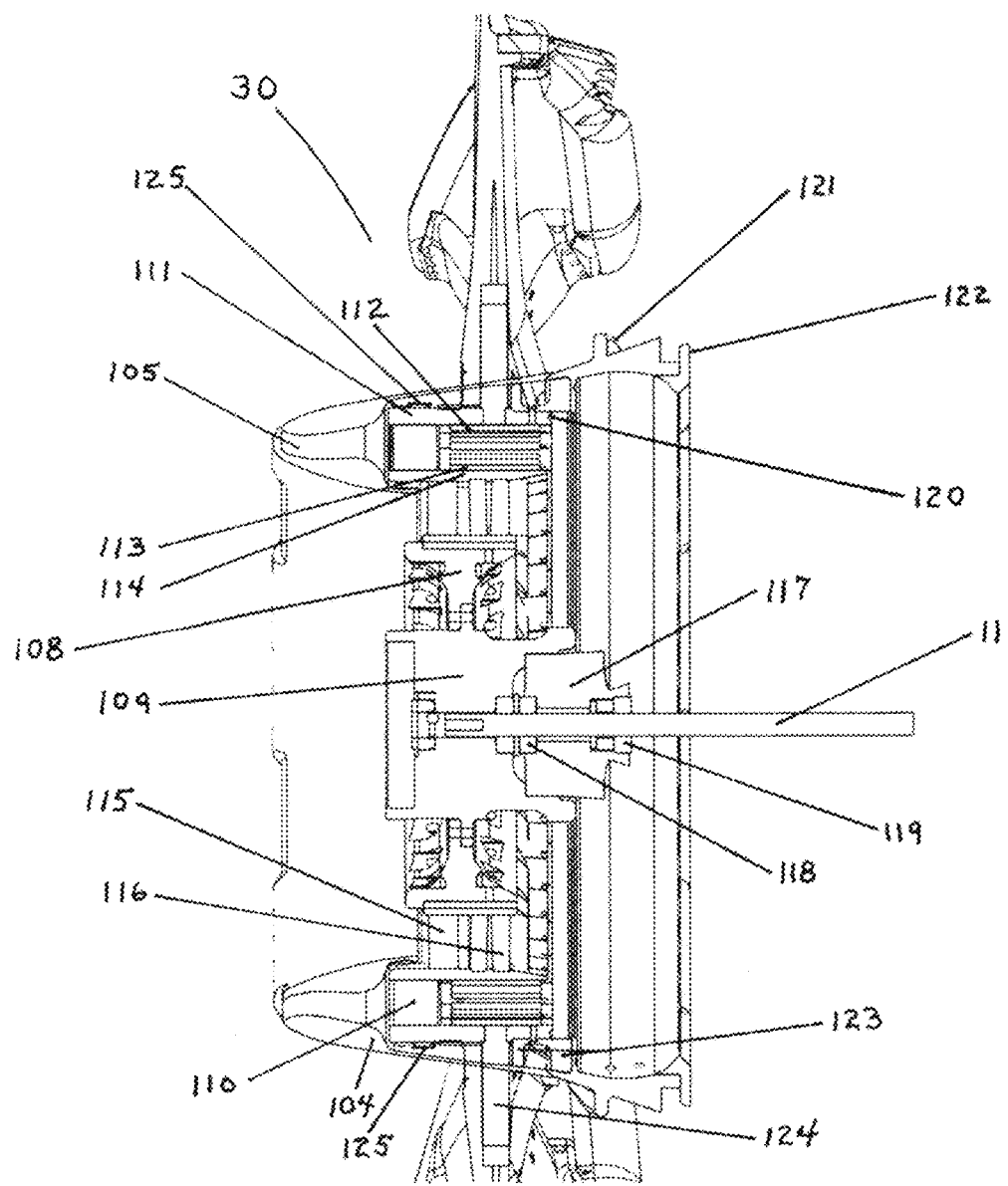
FIG. 6 is a cutaway left side view of FIG. 5, detailing the first rotor blade (aka rotor A) assembly.
Figure 7:
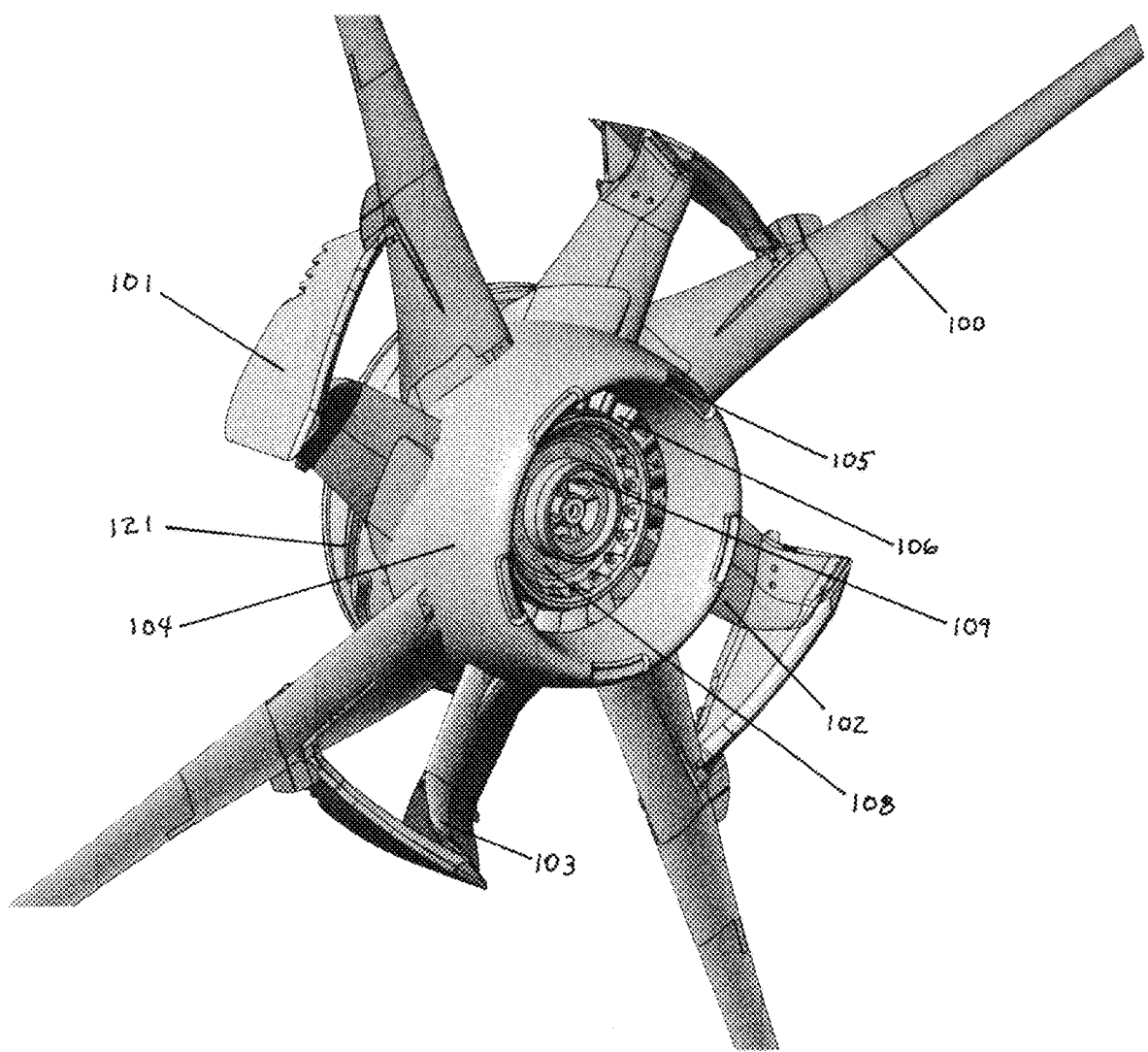
FIG. 7 is a front right side isometric view of some components of the direct drive wind turbine of FIG. 1, detailing the diffuser cuff, main wind turbine blades, and short turbine blades.
Figure 8:
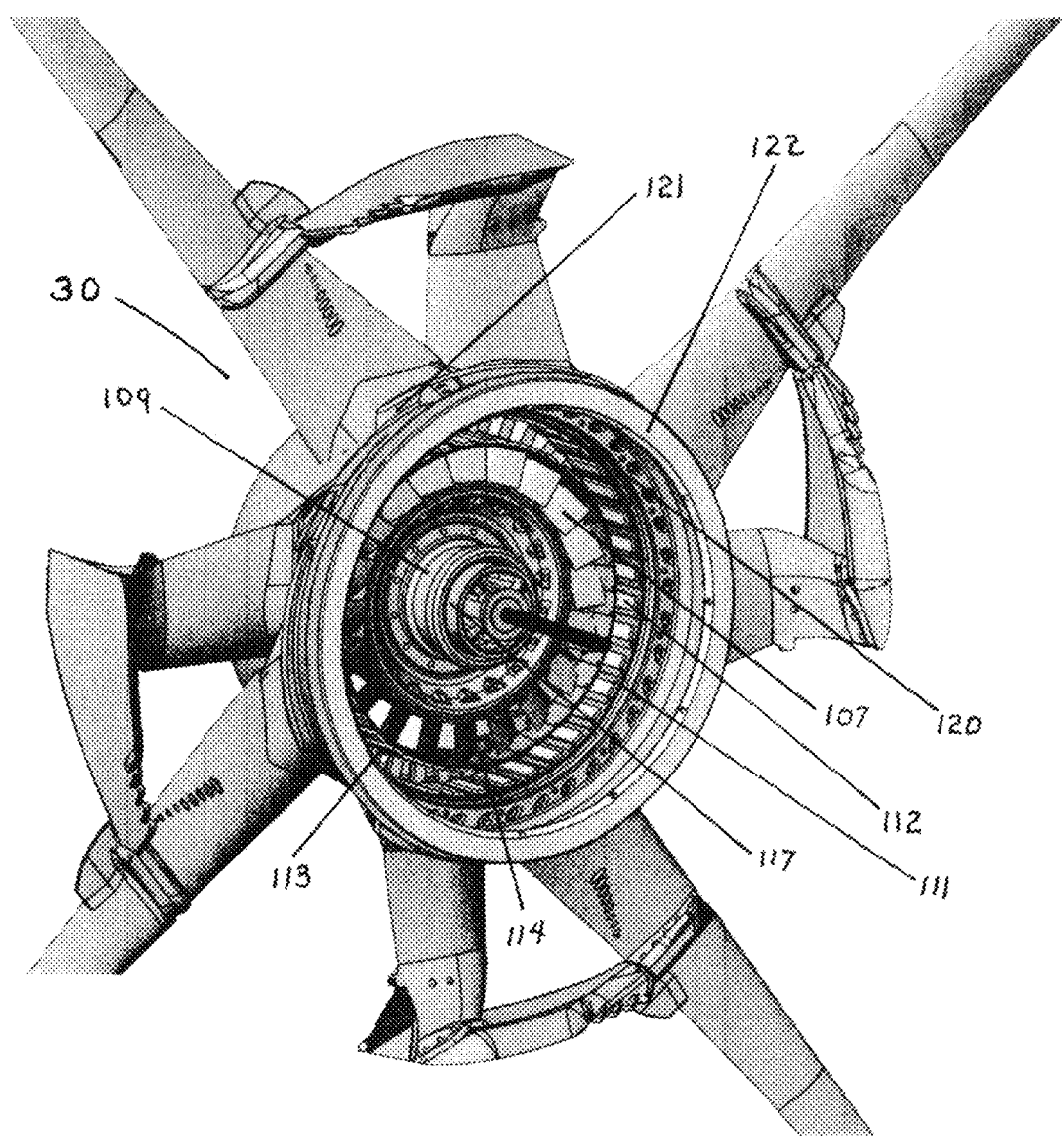
FIG. 8 is a rear left side isometric view of some components of the direct drive wind turbine of FIG. 1, detailing the first rotor blade (aka rotor A) assembly.

With particular attention to FIGS. 2-4, generally from airflow intake (left) side to airflow output (right) side of the direct drive wind turbine system 10, the nose inlet 13 is depicted as centered about the center body nosecone 12, each centered about the slat assembly 14. Each of these components are centered about the longitudinal axis of the direct drive wind turbine system 10. A pair of stator bottom struts of the support tower assembly 299 are attached to the slat assembly 14. The slat assembly 14 comprises a set of forward stator blades 15 and a set of stator flaps 16.

The slat assembly draws extra air into the channel, just ahead of the diffuser ring cuff. The air is accelerated over the stationary ring's leading edge. The leading-edge slat provides an extra boost in energy, which helps prevent separation over the aft, inside diffuser cuff sections. This slat also provides an effective end plate for the stator blades, which is the initial stage for a counter rotating turbine.

The stationary slat assembly extends across the channel's inlet to help draw more airflow inside like an airplane's drooped slat aligns with the upwash to add more energy and lift across the top front of a wing. This circular slat is aligned with the incoming wind direction created by the diffuser cuff but is cambered to bring even more flow in. The slat helps support the stationary blades and to end plate the tips to avoid tip vortices. The two small struts attached to the slat bottom keep the slat assembly from rotating with the first rotor section and to support the forward shaft loads.

Figure 14:
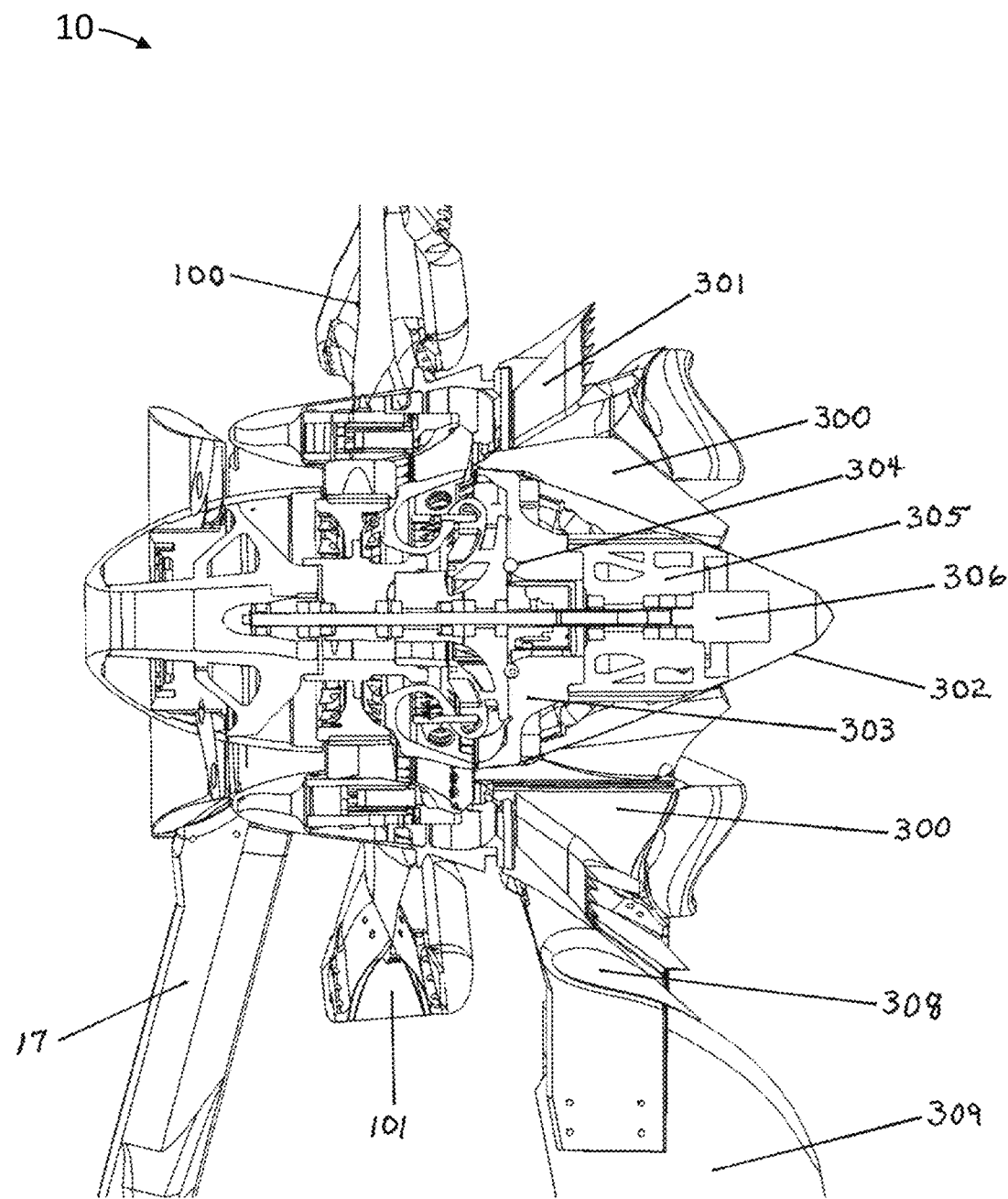
FIG. 14 is a cutaway left side view of some components of the direct drive wind turbine of FIG. 1, detailing aft components.
Figure 15:
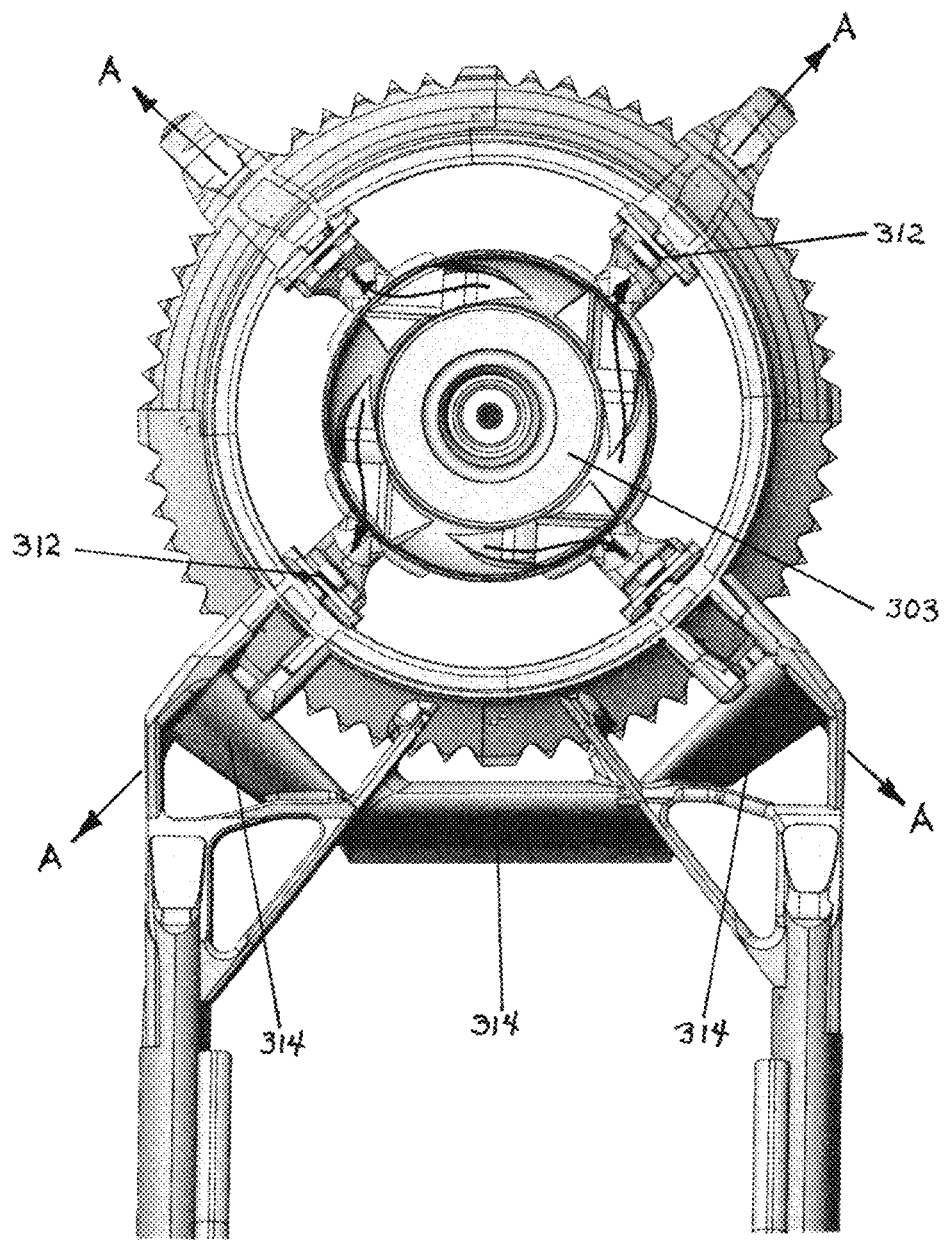
FIG. 15 is a front view of some components of the direct drive wind turbine of FIG. 1 to include airflows around the aft impeller plate to exit out four aft support struts, detailing aft components.
Figure 16:
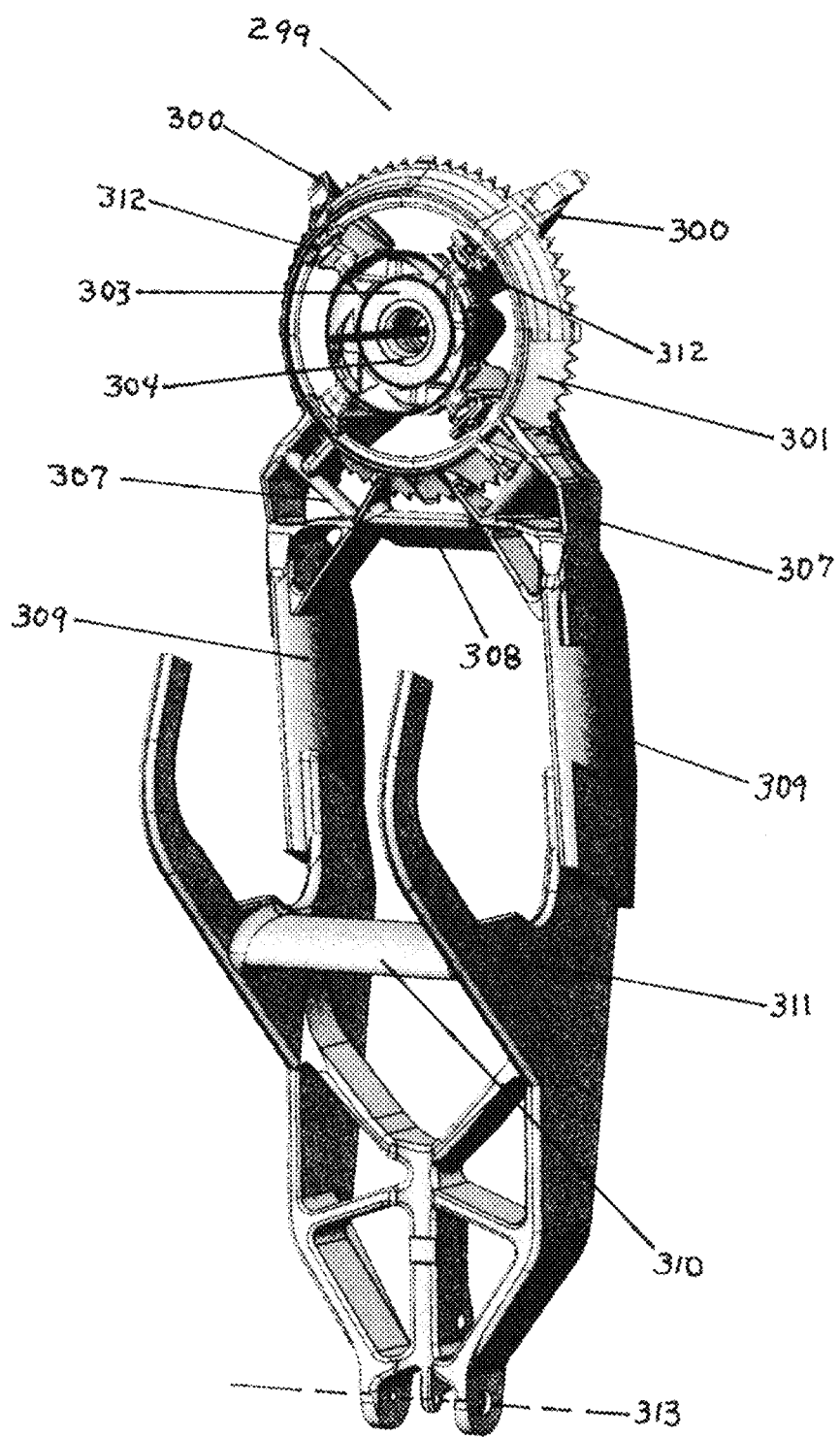
FIG. 16 is a front left side isometric view of some components of the direct drive wind turbine of FIG. 1, detailing aft components and support tower components.
Figure 17:
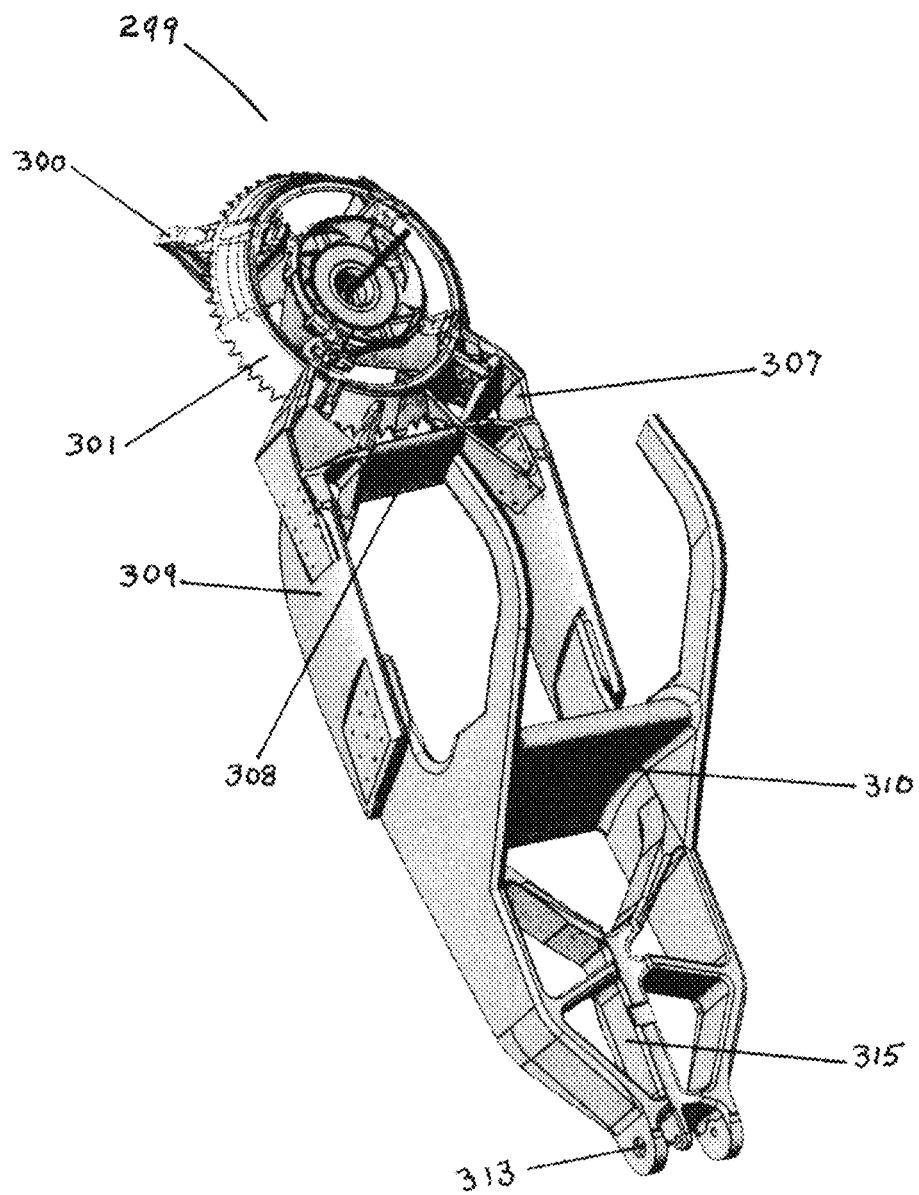
FIG. 17 is a front right side isometric view of some components of the direct drive wind turbine of FIG. 1, detailing aft components and support tower components.
Figure 18:
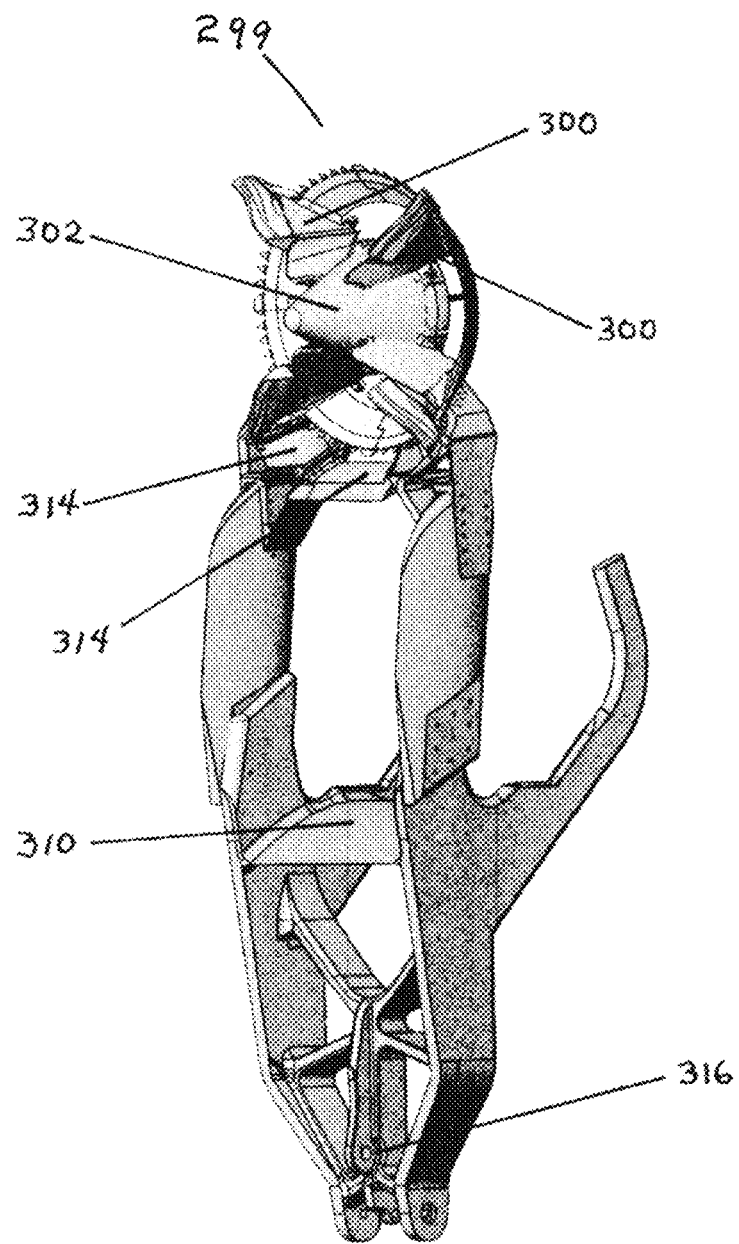
FIG. 18 is a rear right side isometric view of some components of the direct drive wind turbine of FIG. 1, detailing aft components and support tower components.

At the aft or rear of the wind turbine body 19 is an aft diffuser cuff 301 and a center body tail cone 302, both concentric about the longitudinal axis. Struts 307 from diffuser cuff to tower, twin towers 309, and aft thick support structs (4 in total) 300 are also depicted. FIG. 14 depicts additional aft area components. FIGS. 15-18 and 21-25 described below provide more detail regarding the support tower and related components.

FIGS. 5-10 detail aspects and components of the forward section of the wind turbine body 19, to include the diffuser cuff assembly 18 and first rotor blade assembly 30. The turbine shaft 11 operates within or coupled to several roller bearings 118 and several thrust bearings 119.

Generally, the set of first rotor blades help to drive more torque from the main turbine blades 100.

The initial row of rotor blades receives the exit flows from the stator assembly in a circumferential direction. The rotor blades on the first row are of the impulse type since they act like buckets to redirect that incoming flow back out in nearly the opposite direction. Rotor A's blades assists the torque generated from the main and short wind turbine blades for additional power. The main turbine rotor rotates at slightly higher rpms with help from the Rotor A's bucket blades and results in greater power from those boosted speeds. The flow out of the first rotor enters the second counter rotating rotor which has high lift blades of the reactive type. That second rotor B aligns up with the inflow direction at the faster upstream speeds to increase power into the impeller for more cooling flows. Only the initial stator blades and Rotor A's blades, in the counter rotating turbine, have extended chord flaps to energize the flap's suction side, thru a smooth flap gap, to prevent separation over those highly curved surfaces.

The first rotor assembly includes a forward blade 106, a flap 107, a structural disc 108, and core insert 109. The first rotor assembly positions a set of outer magnets 112 just interior to (interior means closer to the longitudinal axis, or closer to the turbine shaft, vs. anterior to meaning relatively farther away from the longitudinal axis or farther away from the turbine shaft) the outer barrel stave 111, and a set of inner magnets 113 just anterior to the inner barrel stave 114. Coil windings 200 are positioned between the inner and outer magnets. As described in more detail below and briefly above, the coil windings 200 rotate in an opposite direction to the set of inner and outer magnets to create an advanced generator with a centralized iron sandwich core.

This iron sandwich generator improves electromagnetic flux where needed beyond an empty central core. Cogging action occurs when iron is in close proximity with a magnet. Racetrack coils, filled inside with an iron core, delay early startup and then causes rotor speeds to hesitate or "cog" up every time the magnets are closely aligned up with a typical iron core.

The centralized iron sandwich core generator of the disclosure has coils sandwiched around buried iron, only in the central region of the coils, so that the magnetic attraction forces are considerably reduced in between the inner and outer magnets. This uniquely shaped iron core draws electromagnetic flux in amongst the center of the relevant coil sections. A smaller iron core is placed inside the middle of the racetrack coil at right angles to the circumferential movement, so the "air" gap is reduced from each magnet to this unique iron sandwich core and out to its sister magnet. Separate coils, like bread in sandwiches, surround this specially shaped iron core. Electromagnetic flux recognizes the easiest path thru iron, instead of air, somewhat similar with a hiker finding the least resistance across a stream by jumping over flat rocks. The steppingstones represent the increasing iron laminated segments towards the center of coil windings, perpendicular to rotation, that are in between the special stacks of round wires transformed into a slimmer rectangular shape. The flattened wire stacks and combined iron/wire stacks have a hole in one parallel section, with rotation, so that solder dropped in could transfer the electrons over into an adjacent layer. The continuous coils can better maintain their tight tolerances within the magnets since the iron sandwiched cores are supported in place with long nonmagnetic iron bolts next to the embedded iron cores.

There is much more electromagnetic flux going directly within the coil's direct path, inside of the magnets, than flux without an intermediate iron path across. The unique shape of the straight iron core draws more electromagnetic flux in towards the core and concentrates the flux into the separated coils that are sandwiched around the iron core. The Lorentz force is the combination of electric and magnetic forces on a particle charge due to electric and magnetic fields. This electromagnetic force for the iron sandwich generator increases by 19% over a field coil winding with no iron core. This becomes obvious when comparing the electromagnetic flux lines of the iron sandwich bunched towards the center of the coil sections at right angles to rotation. This unique iron location is not only where it is most needed in all directions but is also a finite distance away from the magnets to significantly reduce cogging.

Figure 9:
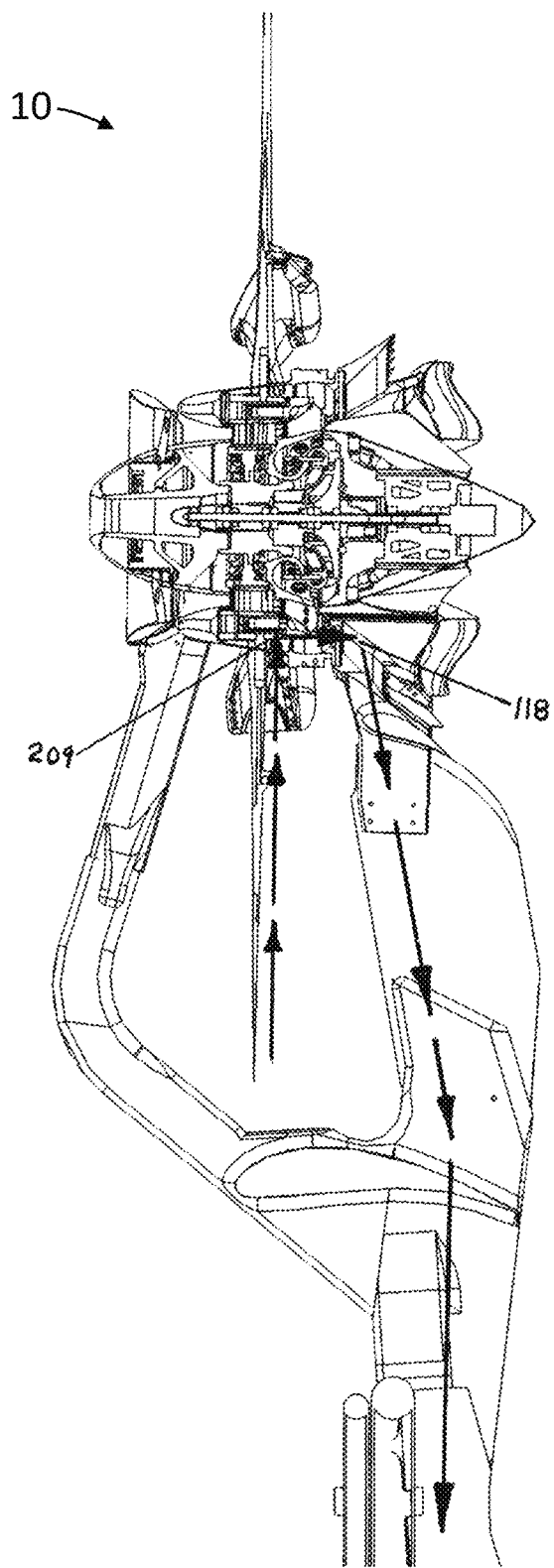
FIG. 9 is a cutaway sideview of the direct drive wind turbine of FIG. 1, illustrating the shortened load path from the productive blade tips back down to ground.

With attention to FIG. 9, blade root loads are bypassed around the vulnerable generator. More specifically, blade loads move in a shortest load path from blade tips to outer barrel staves, back through loose ball bearings, directly into roller bearings in four large support struts and down to the ground.

Figure 11:
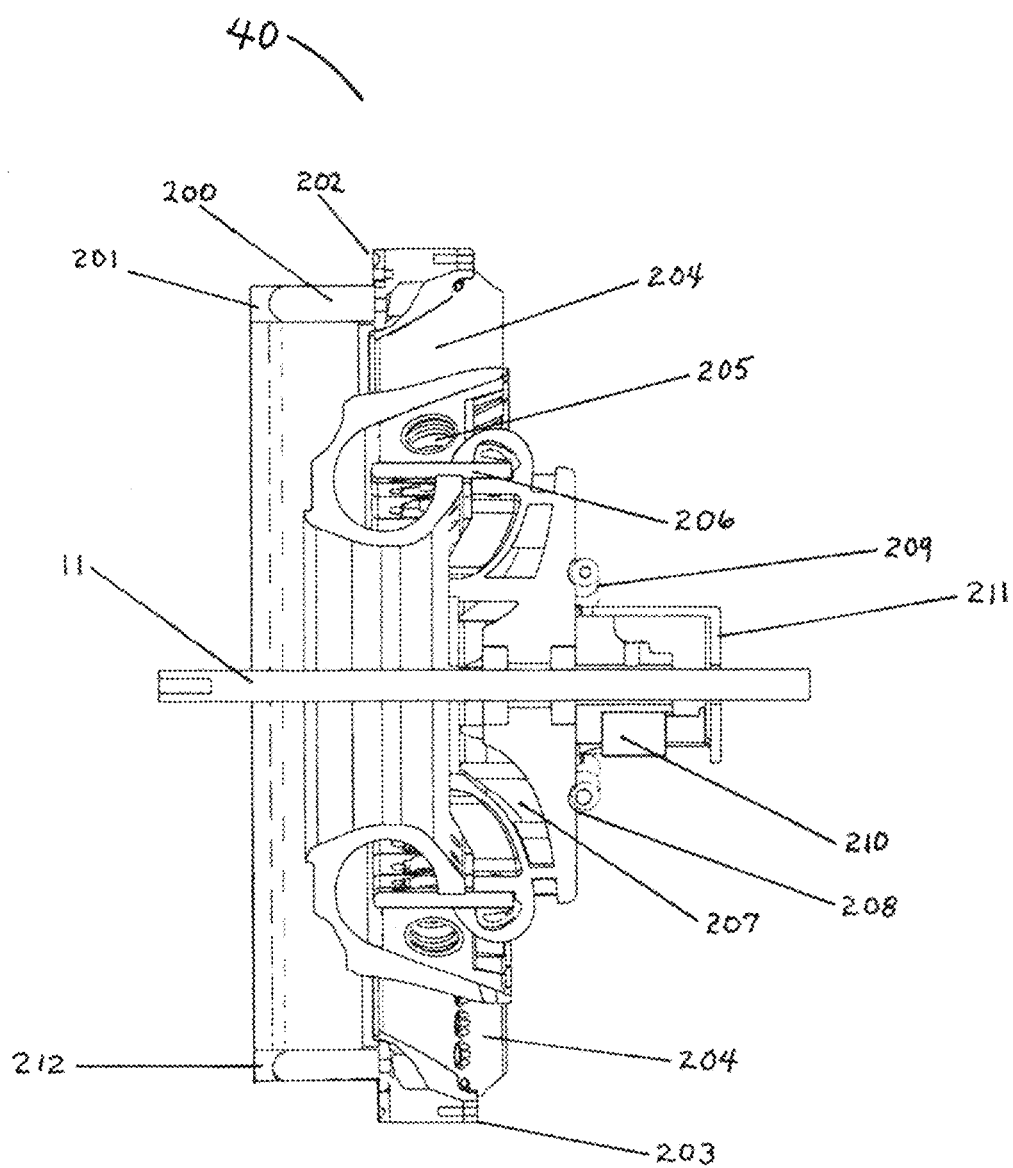
FIG. 11 is a cutaway left side view of some components of the direct drive wind turbine of FIG. 1, detailing the second rotor blade (aka rotor B) assembly.
Figure 12:
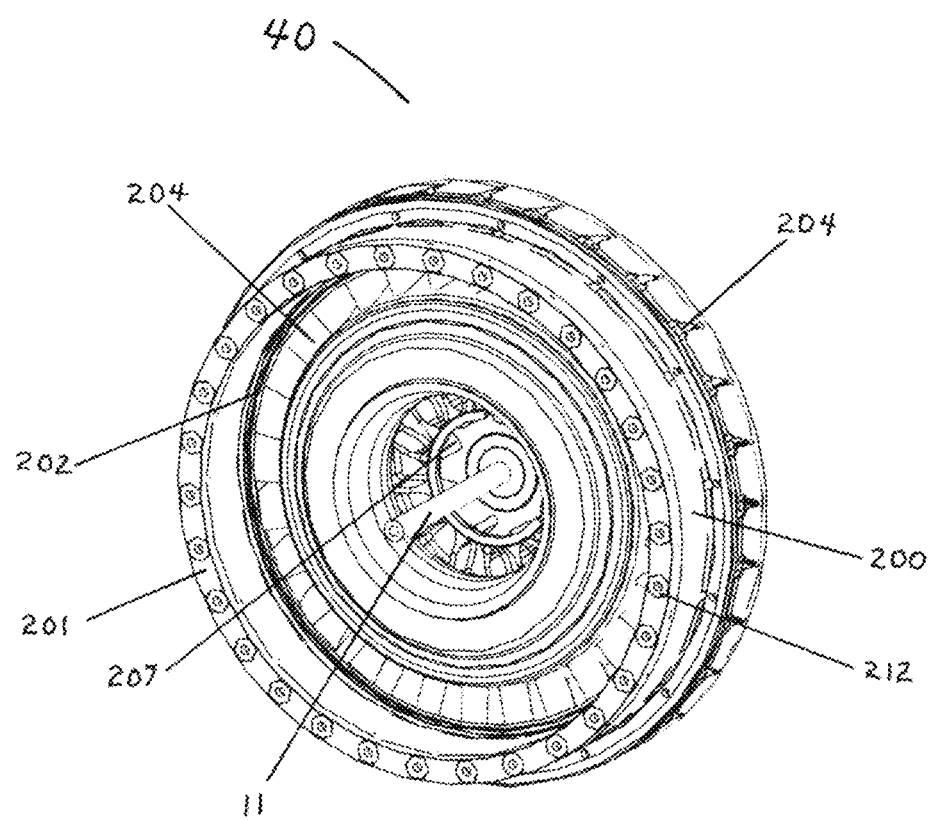
FIG. 12 is a left side front view of some components of the direct drive wind turbine of FIG. 1, detailing the second rotor blade (aka rotor B) assembly.
Figure 13:
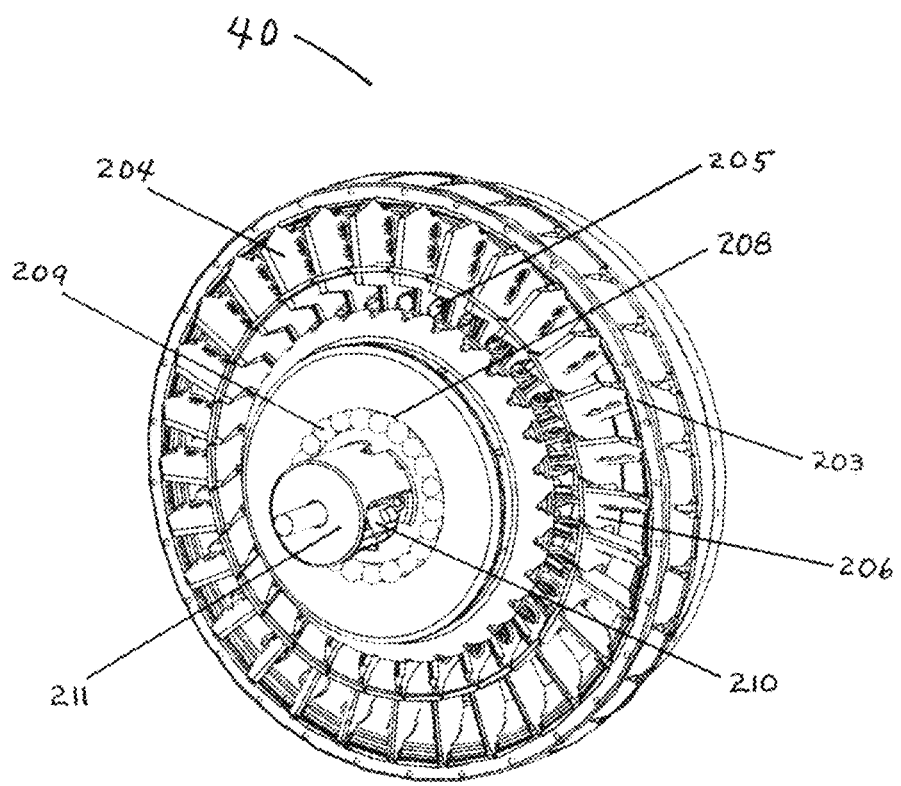
FIG. 13 is a right side rear view of some components of the direct drive wind turbine of FIG. 1, detailing the second rotor blade (aka rotor B) assembly.

FIGS. 11-13 detail aspects and components of the rear section of the wind turbine body 19, to include the impeller 207 and the second rotor blade assembly 40.

Generally, the second rotor blade assembly 40 comprises coil windings 200, a forward coil ring 201, a loose ball bearing groove 202, loose ball bearings (alternating diameters) 209, a steel aft ring 203, and an impeller 207.

The set of second blades (of the second rotor blade assembly 40) drive the impeller 207 to provide forced air cooling to the generator. Typical loss in rotor speed from the upstream rotor is on the order of 17%. Therefore, relative speeds between the magnets and field coil windings are not double but around 183% of typical generator rotation speeds. The voltage and power would also increase by 183% along with the relative speed improvement. However, the impeller losses would also slow down Rotor B's rotational speeds. The impeller must be sized to keep those losses to a minimum while still providing enough forced cooling air to prevent burning up the generator windings from all that extra power.

Note that this configuration provides compressed air that is joined up with waste heat and is slung out the blade's upper surface and out the winglet's blade tips for supplemental thrust in the circumferential direction. The generator's current losses end up as waste heat and must be removed to protect the integrity of the coil's wiring and avoid shorts. Nose inlets are placed in the leading edge of the augmented diffuser cuff. This cooling air easily moves through the coils' windings since open tubing separates the adjacent iron cores around the periphery. Heat can directly flow from the coils and sandwich iron cores into these cooling channels through the matrix.

The center body nacelle has an inlet at the nose. An impeller draws air from the front and slings this core flow out radially. The 3 phase AC currents from Rotor B's coils need to be transferred across to an aft stationary structure. Brushes generate significant heat losses from sparking. Replacing brushes can cause about a 2% increase in maintenance costs. But this disadvantage is far more than offset by almost double the power from counter rotation between the coils and magnets. Slip rings last much longer than brushes and do not arc.

Compressed impeller air with heated air, from the coils and residual brake operation, travel out the turbine blade's top surfaces for blown lift. The remainder of this energized air is directed into the short blades and Y shaped winglets for more lift and torque, faster rpms and more power extracted.

Figure 22:
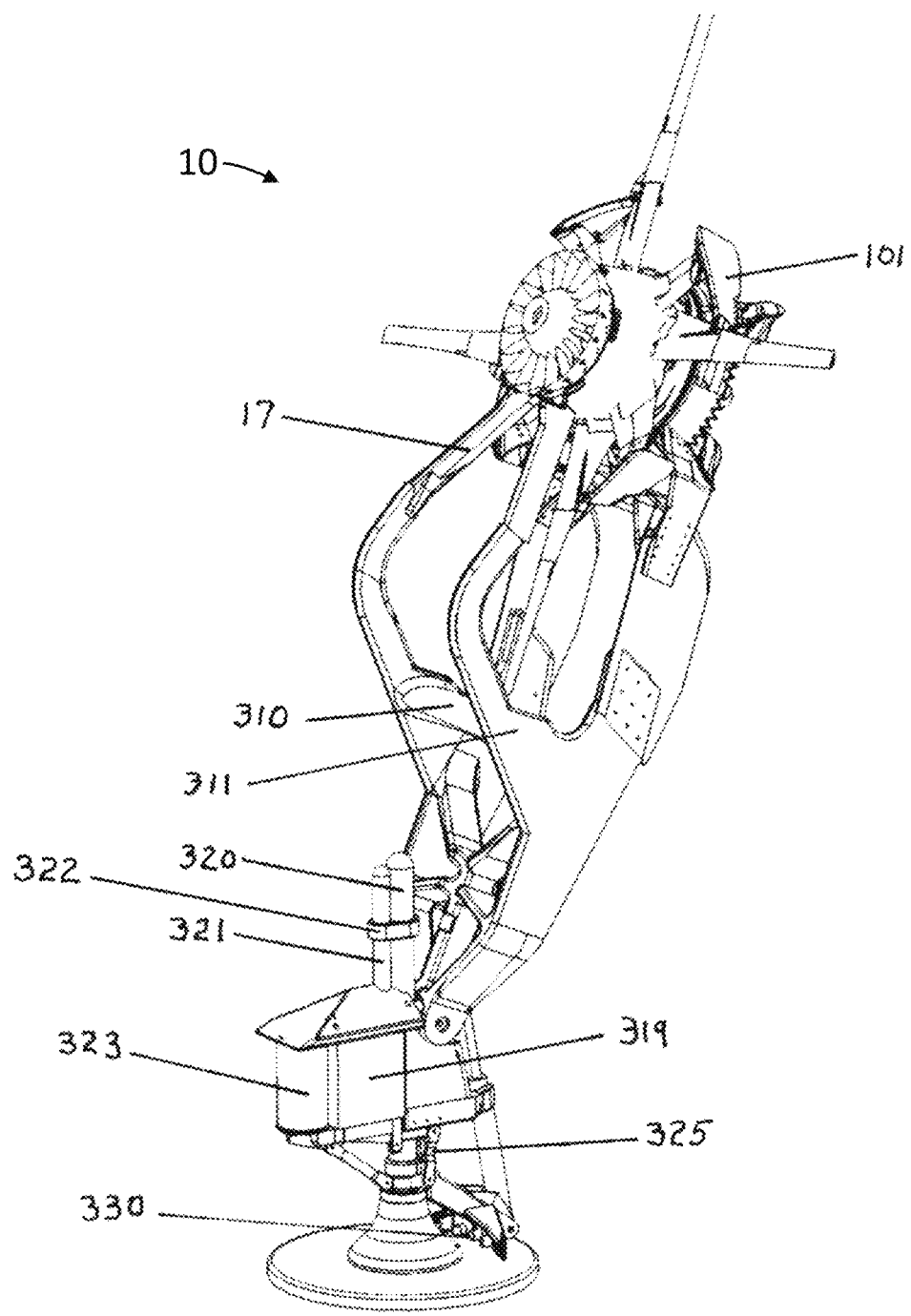
FIG. 22 is a front left side view of the direct drive wind turbine of FIG. 1 in a partially reclined state, detailing support tower components.
Figure 23:
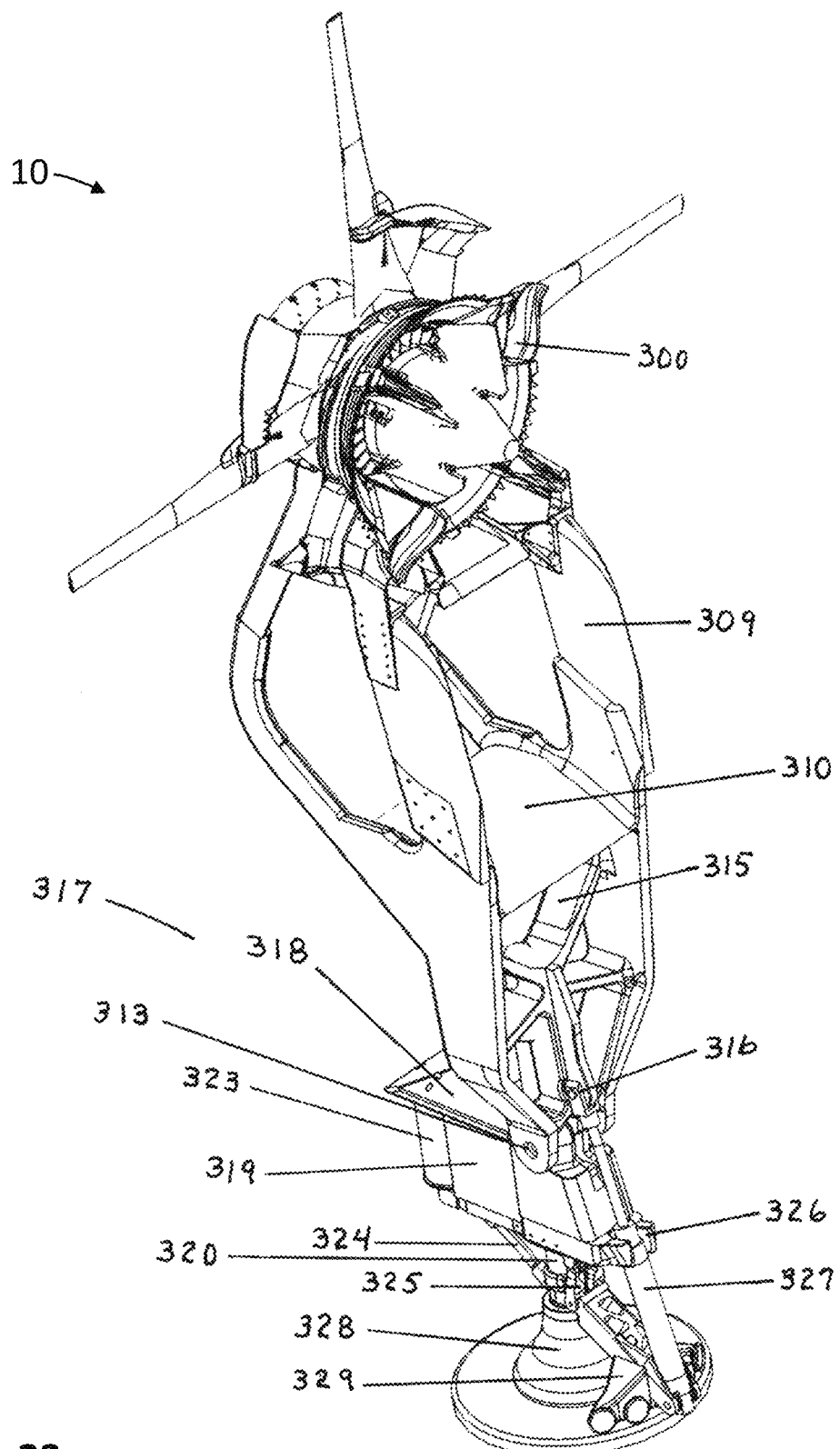
FIG. 23 is a left-side perspective view of the direct drive wind turbine of FIG. 1, illustrating some components of the support tower.
Figure 24:
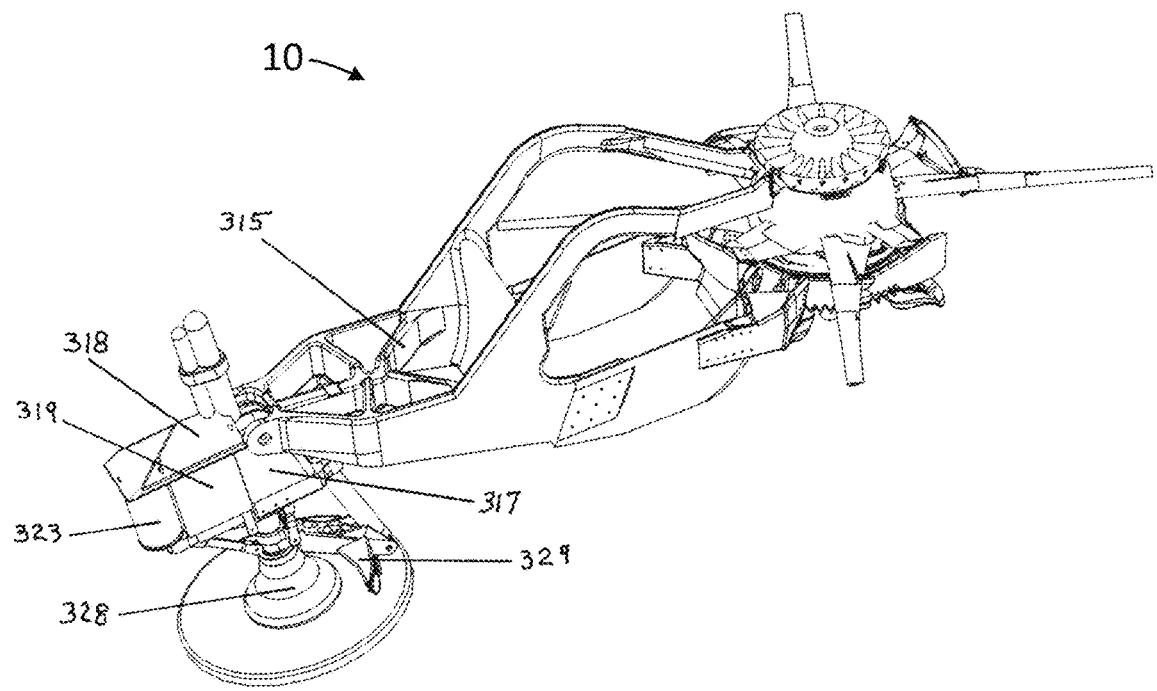
FIG. 24 is a front left side view of the direct drive wind turbine of FIG. 1 in a partially reclined state, detailing support tower components.
Figure 25:
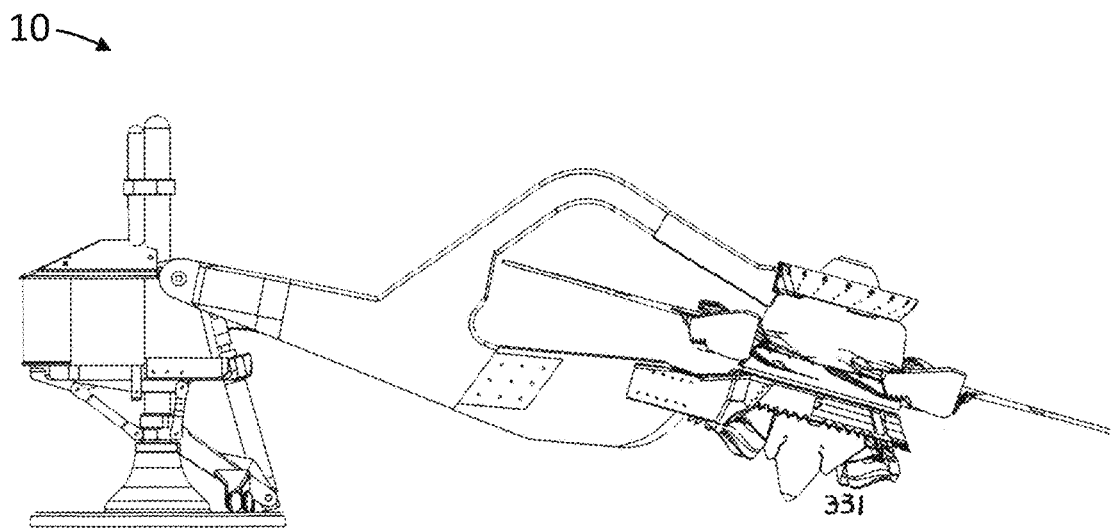
FIG. 25 is a left side view of the direct drive wind turbine of FIG. 1 in a fully reclined state, detailing support tower components.

FIGS. 15-18 and 21-25 provide more detail regarding the support tower and related components. The direct drive wind turbine 10 is configured to rotate about tilt axis 313, as shown in FIGS. 22, 24 and 25. Components of the support tower are identified in FIGS. 15-18 and 21-25 with reference to the list of components and associated numbering described above.

Generally, a conventional wind turbine must shut down around wind speeds of 25 meters/second since there may not be a secondary generator available to kick in at those higher speeds and/or the means to furl the blades out of the slipstream are not fast enough before any sharp edge gust destroys the blades. This disclosed wind turbine has twin aerodynamically shaped towers which can pivot instantaneously backwards relative to thrust loads directly on the blades and tower. The dynamic loads on the entire structure are significantly reduced with a fallback tower that can instantly transmit those loads down thru an air shock cylinder to a trailing bogey and ground. The sharp wind gusts are not only smoothed out, but the entire wind tower is in a more favorable fallback position to absorb any higher wind gusts. Safety is not dependent on the braking, blade pitch angle, switching or any control system. Automatic fallback position allows this wind turbine to operate continuously even in extreme conditions near a slightly higher cutoff speed with greater assurance it will be durable enough to last for 30 years. All other wind turbines must have extremely high factors of safety around 2.5 to 3.0 times over expected design loads. If any maintenance or cleaning is required, then the fallback tower is easily accessed when parked on a cradle next to the ground from a truck with a bucket lift. The cradle could have a small crane to lift off any intermediate sections.

Furthermore, the beneficial tower interaction draws more wind and steadier wind into the blades. A round tower, in close proximity behind the blades, creates a shadow influence back onto the wind turbine blades. This shadow effect has proven to be much greater than initially expected. The shadow influence produces rapid local blade angle changes and dynamic stall events with each blade passage, in front of the large cylindrical tower, with its alternating trailing vortices.

Also, the center body bullet and diffuser ring are supported by twin airfoil struts just downwind of the blades, instead of a typical cylinder tower. The twin aerodynamic struts help the yaw motors to align the wind turbine into the prevailing wind.

Twin tower struts are in the form of airfoils that diverge outward, on the aft side, to pull more air in below where the wind pressures are normally impacted the most, because of obstructions on the ground. The aerodynamic twin struts, behind the blades, allow the remaining lower support tower, below the blade tips, to be shorter since the lowest wind pressures are now improved nearest to the ground. A mid platform includes a high lift wing in between the twin struts for greater tower rigidity and strength. The high lift airfoil rapidly accelerates incoming winds on its top suction side directly outside of the blade tips rotation. This improved performance of the blade tips counteracts the disparity between the top arc segment and the bottom arc segment closest to ground obstructions and greater turbulence.

Furthermore, the backwards Furling Wind Turbine structure allows instantaneous thrust reduction and overload protection under high wind gust conditions. This flexible tower permits a knee action between the upper airfoil tower struts attached to the diffuser ring and the bottom tower. Other wind turbines might alleviate high wind loads by furling off to the side, out of the wind direction, or with moveable blade tips or stall type airfoil blades.

Thrust loads directly impact the entire wind turbine structure and can destroy the blades within one revolution. Backwards furling blades can rotate rearward out of the wind to instantaneously relieve high loads due to extreme wind spikes.

Costs are directly correlated with weight. The structural weight directly depends on the loads due to winds and gravity. The blades remain vertically upright within the wind turbine's maximum cutoff wind speed. If exceeded, the upper wind turbine will be blown backwards out of the wind by the large thrust component on the blades and tower. An air shock cylinder allows the entire upper wind turbine section to fall back relative to the thrust loads. The air pressure within the shock cylinder can be controlled by predicted winds or actual peripheral wind measurements. The factor of safety, or load carrying capacity beyond expected load, can therefore be reduced, since there is less uncertainty, regardless of any mechanical or electrical failure. Maintenance becomes much easier, less costly and considerably safer since the wind turbine can be rotated back almost completely down next to the ground. The entire upper wind turbine can be easily accessible by a power linesman's operator bucket.

Benefits of the disclosed direct drive wind turbine system include reduced structural loads because of many features, but most importantly, due to short circuiting turbine blade loads directly around the generator. The design loads have been reduced considerably by the lower torque loads as a result of much shorter blade load paths. The load paths from the blade tips to the generator loads are much shorter than clear into the shaft diameter and back along the shaft, like the typical generator. This generator resides out within the diffuser ring, which is about one quarter of the blade's tip radius. Most of the wind turbine's torque comes from the blade tips, and now that driving torque has been short-circuited more directly into the driven generator.

The structural load path from the outer quarter of the wind turbine blades (greatest speeds at the highest radius) down to the 25% radius gets quickly complicated for the traditional wind turbine layout. The outer aerodynamic shape transforms into an ineffective airfoil before losing all lift and generating tremendous drag thru the circular root section. All those loads are transferred thru tightly torqued bolts into the spinner nose and back into the axle rod. Loads are then transferred back along the axle thru brakes, transmission and into the generator and then out to the radius at which the magnets are swirling around the coils.

The disclosed advanced wind turbine takes the loads from the wind turbine blade down to the 23% radius and transfers the torque directly into the outer magnets iron ring and U channel ring. The outer magnets are connected on the front side to the inner magnets iron ring with short cylinders, perpendicular to the rotor axis. The short thick cylinders provide an easy path in between for high recovery cooling air into the coils. The magnets are just inside of those iron rings and together forms an easy flux path around the short cylinders to appear, from the side, like a tuning fork, without the handle.

Bending moments and stresses on the main turbine blades are much lower than normal. The bending moments are taken out at the augmented diffuser cuff position (about 23% radius) instead of the centerline. If the wind turbine blade is considered a simple uniformly loaded cantilevered beam, then the maximum bending moment would be only 62% of a typical full-length blade, for a similar turbine blade configuration.

Blade loads are not just taken out at the plane of the blade's circular root section by dozens of bolts. Instead, some of the main blade's load is taken out around the 40% blade radius to be split out with a circular fence over to be shared with the short blade's Y shaped winglets. The trailing short blade not only shares the main blade's load but also helps to stiffen those thin blade sections to avoid a tower strike. The circular fence, between the main turbine blade and short blade, also serves to end plate the short blade's winglets for less tip losses. The short blade trails close enough to the main blade to make it impossible for any inner trailing vortices off the main blade's root to curl around and meet up around to the top suction side and cause root stall radially out towards the tips.

The inner supporting rods do not have to transfer all those tremendous wind turbine loads into the axle. The generator has already been driven by the resultant torque inside the augmented diffuser cuff. Supporting rods, like the small wires on a bicycle wheel, only need to jointly share any remaining rotary and gravity loads. Since structural loads have been greatly diminished, then the weight has also been reduced. Lower costs, of course, would also correlate with the lower weights.

Braking loads are also transferred more directly back into slowing the blades down and stopping rotation for maintenance. The blade's torque is transferred from the blade's root in the diffuser ring directly over to an adjacent U channel ring. The aft portion of that U ring forms the disc plate for the disc brakes. Each disc brake is supported by a stationary yoke out the back of the diffuser augmenter cuff to transfer those loads directly into one of the twin airfoil tower struts.

Also, the disclosed system may provide green energy storage of hydrogen and oxygen from electrolysis of water during high wind operation. Storage of wind energy can be dealt with batteries or pumping water to higher levels. This wind turbine configuration is a green natural for electrolysis and storing of energy into hydrogen. Far greater electrical power can be created from this counter rotating turbine configuration, for a given blade diameter, than any typical wind turbine. This generator is positioned radially out further than other direct drive generators to create higher generator speeds. The larger circumferential speeds at the larger radius are then almost doubled from counter rotational turbine operation. The fallback tower allows all this extra power, at the higher wind gusts, to be more safely available. Forced cooling, from the impeller, also makes it safer to withstand these higher currents without meltdown. Extracting extra power, near cutoff wind speeds, can help slow any runaway rotations by bringing on more and more electrolysis cells accordingly.

Additional benefits of the disclosed direct drive wind turbine include:

Placing the wind turbine's blades directly to the diffuser cuff, near a quarter of the way out to the blade's tip radius, drastically reduces the root bending loads. Those loads do not overburden the inner structure but are offloaded directly behind to the aft support structure and down to ground. The forward part of the diffuser cuff includes the magnets of the generator and the bucket blades for the first rotor section of the counter rotating turbine. Therefore, this Direct Drive wind turbine has the shortest possible structural load path that is even possible. Those main turbine blade's loads and moments go directly from the driving blade sections that create the most torque into the driven generator.

The turbine blades on the fallback tower reacts immediately to absorb any high gusts that impact the topside structures. Those sharp gust loads bypass most all of those thrust loads thru an air shock cylinder directly to a trailing bogey and ground.

The exemplary systems and methods of this disclosure have been described in relation to systems and methods involving a direct drive wind turbine. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that some of the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of generating electrical power from a direct drive wind turbine comprising:
   providing a direct drive wind turbine, the direct drive wind turbine comprising:
   a wind turbine body comprising:
   a center body;
   a nose inlet;
   a wind turbine shaft defining a longitudinal axis of the wind turbine body;
   a stator assembly comprising a set of stator blades;
   a diffuser augmenter cuff assembly comprising:
   a first rotor blade assembly rotating about the longitudinal axis in a first axial direction and comprising an outer barrel stave coupled to a set of outer magnets, an inner barrel stave coupled to a set of inner magnets, and a set of first rotor blades;

a second rotor blade assembly rotating about the longitudinal axis in a second axial direction opposite the first axial direction and comprising armature coils positioned between the set of outer magnets and the set of inner magnets, and a set of second rotor blades;
a set of short turbine blades;
a set of main turbine blades connected to the first rotor blade assembly; and
a support tower affixed to the Earth and attached to the wind turbine body;
receiving airflows comprising:
a first airflow into the nose inlet;
a second airflow into the diffuser augmenter cuff assembly;
a third airflow; and
a fourth airflow: i) operating on the set of short turbine blades to create a short turbine blade torque about the wind turbine shaft and to rotate the first rotor blade assembly about the longitudinal axis, and ii) operating on the set of main turbine blades to create a main turbine blade torque about the wind turbine shaft and to rotate the first rotor blade assembly about the longitudinal axis;
routing the second airflow within the diffuser augmented cuff assembly to form a channeled second airflow; and
routing the channeled second airflow to the first rotor blade assembly to urge rotation of the first rotor blade assembly in the first axial direction and to urge rotation of the second rotor blade assembly about the second axial direction; wherein:
the rotation of the set of outer magnets and the set of inner magnets opposite to the rotation of the armature coils generates electricity.

2. The method of claim 1, the wind turbine body further comprising an impeller assembly providing cooling to the set of outer magnets, the set of inner magnets, and the armature coils.

3. The method of claim 2, further comprising the step of routing at least some of the first airflow into the impeller assembly.

4. The method of claim 1, wherein at least some of first airflow flows through a channel within the set of second rotor blades.

5. The method of claim 1, wherein a majority of structural loads from the main turbine blades are transferred to the support tower.

6. The method of claim 1, wherein the set of outer magnets, the set of inner magnets, and the armature coils form a radial flux generator.

7. The method of claim 1, wherein the third airflow is received by the set of outer magnets, the set of inner magnets, and the armature coils.

8. The method of claim 1, wherein the diffuser augmented cuff assembly attaches to the set of main turbine blades at a distance between 20%-30% of the length of a particular main turbine blade operating radius.

9. The method of claim 1, wherein each short turbine blade is connected to a respective main turbine blade by way of a Y winglet.

10. The method of claim 9, wherein each Y winglet is connected to a circular fence.

11. A direct drive wind turbine system comprising:
a wind turbine body comprising:
a center body;
a nose inlet;
a wind turbine shaft defining a longitudinal axis of the wind turbine body;
a stator assembly comprising a set of stator blades;
a diffuser augmenter cuff assembly comprising:
a first rotor blade assembly configured to rotate about the longitudinal axis in a first axial direction and comprising an outer barrel stave coupled to a set of outer magnets, an inner barrel stave coupled to a set of inner magnets, and a set of first rotor blades;
a second rotor blade assembly configured to rotate about the longitudinal axis in a second axial direction opposite the first axial direction and comprising armature coils positioned between the set of outer magnets and the set of inner magnets, and a set of second rotor blades;
a set of short turbine blades;
a set of main turbine blades attached to the first rotor blade assembly; and
a support tower affixed to the Earth and attached to the wind turbine body;
wherein:
a first airflow is received by the nose inlet;
a second airflow is received by the diffuser augmenter cuff assembly and channeled to form a channeled second airflow, the channeled second airflow routed to engage the first rotor blade assembly, to urge rotation of the first rotor blade assembly in the first axial direction, and to urge rotation of the second rotor blade assembly about the second axial direction;
a third airflow is received by the set of outer magnets, the set of inner magnets, and the armature coils;
a fourth airflow is received by: i) the set of short turbine blades to create a short turbine blade torque about the wind turbine shaft and to rotate the first blade assembly about the longitudinal axis, and ii) the set of main turbine blades to create a main turbine blade torque about the wind turbine shaft and to rotate the first blade assembly about the longitudinal axis; and
rotation of the set of outer magnets and the set of inner magnets opposite to the rotation of the armature coils generates electricity.

12. The system of claim 11, the wind turbine body further comprising an impeller assembly receiving at least some of the first airflow to provide cooling to at least one of the set of outer magnets, the set of inner magnets, and the armature coils.

13. The system of claim 12, wherein the impeller assembly outputs a received airflow in a radially outward direction.

14. The system of claim 11, wherein the support tower is attached to the stator assembly and to the second rotor assembly.

15. The system of claim 14, wherein the support tower may be configured in an upright position and a folder position.

16. The system of claim 11, wherein each of the stator blades comprise a stator blade trailing flap.

17. The system of claim 16, wherein each of the first rotor blades comprise a first rotor blade trailing flap.

18. The system of claim 11, wherein each of the set of main turbine blades are attached to the outer barrel stave.

19. The system of claim 11, the wind turbine body further comprising a circular slat positioned adjacent the set of stator blades.

20. A direct drive wind turbine generating electricity, comprising:

a wind turbine body comprising:
  a center body;
  a nose inlet;
  a wind turbine shaft defining a longitudinal axis of the wind turbine body;
  a stator assembly comprising a set of stator blades, each of the stator blades comprising a stator blade trailing flap;
  a diffuser augmenter cuff assembly comprising:
    a first rotor blade assembly configured to rotate about the longitudinal axis in a first axial direction and comprising an outer barrel stave coupled to a set of outer magnets, an inner barrel stave coupled to a set of inner magnets, and a set of first rotor blades, each of the first rotor blades comprising a first rotor blade trailing flap;
    a second rotor blade assembly configured to rotate about the longitudinal axis in a second axial direction opposite the first axial direction and comprising armature coils positioned between the set of outer magnets and the set of inner magnets, and a set of second rotor blades;
  an impeller assembly providing cooling to the set of outer magnets, the set of inner magnets, and the armature coils;
  a set of short turbine blades;
  a set of main turbine blades attached to the outer barrel stave; and
  a support tower affixed to the Earth and attached to the stator assembly and to the second rotor assembly;

wherein:
  a first airflow is received by the nose inlet, at least some of the first airflow routed into the impeller assembly;
  a second airflow is received by the diffuser augmenter cuff assembly and channeled to form a channeled second airflow, the channeled second airflow routed to engage the first rotor blade assembly, to urge rotation of the first rotor blade assembly in the first axial direction, and to urge rotation of the second rotor blade assembly about the second axial direction;
  a third airflow is received by the set of outer magnets, the set of inner magnets, and the armature coils;
  a fourth airflow is received by: i) the set of short turbine blades to create a short turbine blade torque about the wind turbine shaft and to rotate the first blade assembly about the longitudinal axis, and ii) the set of main turbine blades to create a main turbine blade torque about the wind turbine shaft and to rotate the first blade assembly about the longitudinal axis;
  the diffuser augmented cuff assembly attaches to the set of main turbine blades at a distance between 20%-30% of the length of a particular main turbine blade operating radius;
  each short turbine blade is connected to a respective main turbine blade by way of a Y winglet; and
  rotation of the set of outer magnets and the set of inner magnets opposite to the rotation of the armature coils generates electricity.

\* \* \* \* \*